United States Patent
Reddy et al.

(10) Patent No.: US 10,952,027 B2
(45) Date of Patent: Mar. 16, 2021

(54) DETECTION OF ANOMALY RELATED TO INFORMATION ABOUT LOCATION OF MOBILE COMPUTING DEVICE

(71) Applicant: Google LLC, Mountain View, CA (US)

(72) Inventors: Prashant Reddy, Pittsburgh, PA (US); Mark Rajan Malhotra, San Mateo, CA (US); Jesse Boettcher, San Jose, CA (US); Timo Bruck, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/114,294

(22) Filed: Aug. 28, 2018

(65) Prior Publication Data

US 2018/0367954 A1 Dec. 20, 2018

Related U.S. Application Data

(63) Continuation of application No. 15/455,025, filed on Mar. 9, 2017.

(60) Provisional application No. 62/305,960, filed on Mar. 9, 2016, provisional application No. 62/305,975, filed on Mar. 9, 2016.

(51) Int. Cl.
| | | |
|---|---|---|
| *H04W 24/00* | (2009.01) | |
| *H04W 4/029* | (2018.01) | |
| *H04W 68/00* | (2009.01) | |
| *H04W 4/021* | (2018.01) | |
| *H04L 12/28* | (2006.01) | |
| *H04W 64/00* | (2009.01) | |

(52) U.S. Cl.
CPC ........... *H04W 4/029* (2018.02); *H04W 4/021* (2013.01); *H04W 68/005* (2013.01); *H04L 12/2823* (2013.01); *H04W 64/003* (2013.01)

(58) Field of Classification Search
CPC ..... H04W 88/02; H04W 24/00; H04W 64/00; H04W 4/02; H04W 48/04
USPC ........ 455/422.1, 423–425, 456.1–456.6, 457
See application file for complete search history.

(56) References Cited

U.S. PATENT DOCUMENTS

| | | | |
|---|---|---|---|
| 5,928,306 A | 7/1999 | France | |
| 6,429,811 B1 * | 8/2002 | Zhao | ....................... G01S 19/27 |
| | | | 342/357.66 |
| 8,560,218 B1 * | 10/2013 | Kahn | .................... G01S 19/215 |
| | | | 701/469 |
| 2004/0160336 A1 * | 8/2004 | Hoch | ....................... G06F 3/011 |
| | | | 340/4.31 |
| 2005/0059391 A1 | 3/2005 | Ikeda | |
| 2010/0283832 A1 | 11/2010 | Lin | |
| 2011/0141276 A1 | 6/2011 | Borghei | |

(Continued)

*Primary Examiner* — Matthew W Genack
(74) *Attorney, Agent, or Firm* — Butzel Long; Donald J. Lecher

(57) ABSTRACT

In a method for detection of an anomaly related to information about a location of a mobile computing device, the anomaly related to the information about the location of the mobile computing device can be detected by a processor of the mobile computing device. A communication about the anomaly can be provided via a user interface of the mobile computing device. The anomaly can be caused by a bug in an operating system of the mobile computing device. Notifications about the anomaly can be provided to a user of the mobile computing device or other mobile computing devices registered to a shared account.

10 Claims, 14 Drawing Sheets

(56) References Cited

U.S. PATENT DOCUMENTS

| | | | |
|---|---|---|---|
| 2012/0065944 A1* | 3/2012 | Nielsen | G06Q 10/103 |
| | | | 703/1 |
| 2014/0006458 A1 | 1/2014 | Hsieh | |
| 2014/0213262 A1* | 7/2014 | Singh | H04W 36/32 |
| | | | 455/437 |
| 2014/0222280 A1* | 8/2014 | Salomonsson | G08G 1/167 |
| | | | 701/28 |
| 2015/0096352 A1 | 4/2015 | Peterson | |
| 2015/0156744 A1 | 6/2015 | Haro | |
| 2015/0156808 A1 | 6/2015 | Brantner | |
| 2015/0159351 A1* | 6/2015 | Smith | E03C 1/025 |
| | | | 251/129.11 |
| 2015/0215832 A1 | 7/2015 | Fitzpatrick | |
| 2016/0110987 A1* | 4/2016 | Hughes | H04W 4/029 |
| | | | 340/573.4 |
| 2016/0150367 A1 | 5/2016 | Anand | |
| 2016/0239723 A1* | 8/2016 | Ge | G08B 13/19615 |
| 2017/0187862 A1* | 6/2017 | Rahman | H04W 76/14 |
| 2017/0227574 A1 | 8/2017 | Theytaz | |

* cited by examiner

DETECTION OF ANOMALY RELATED TO INFORMATION ABOUT LOCATION OF MOBILE COMPUTING DEVICE

BACKGROUND

The advancement of electronic communication network bandwidth capabilities in the last decade has fostered the realization of premises management systems. Premises management systems can allow automated control of components, such as, for example, heating, ventilation, and air conditioning ("HVAC") systems, lighting systems, home theater, entertainment systems, and security systems. Premises management systems can include control panels through which a user can input settings, preferences, and/or scheduling information.

Additionally, the advancement of electronic communication network bandwidth capabilities has enabled the development of mobile computing devices such as, for example, tablet computers, smartphones, and smart watches. Electronic communication networks can allow such mobile computing devices to obtain information about their locations. The combination of the portability of mobile computing devices and the ability of these devices to obtain information about their locations has encouraged the introduction of applications that expand the functionality of these devices.

BRIEF SUMMARY

According to an implementation of the disclosure, a mobile computing device can generate an indicator of a location of the mobile computing device. An application that interfaces with a premises management system and is executing on the mobile computing device can determine that the indicator is associated with an anomaly. The user interface of the mobile computing device can provide to a user of the mobile computing device, a notice of the anomaly.

According to an implementation of the disclosure, a non-transitory computer readable medium can store instructions that, when executed by a processor, cause the processor to perform operations that can include generating, by a mobile computing device, an indicator of a location of the mobile computing device; determining, by an application that interfaces with a premises management system and is executing on the mobile computing device, that the indicator is associated with an anomaly; and providing, by a user interface of the mobile computing device to a user of the mobile computing device, a notice of the anomaly.

According to an implementation of the disclosure a system can include a computing device in communication with a premises management system and having a processor; and a non-transitory, computer-readable medium in communication with the processor and storing instructions that, when executed by the processor, cause the processor to perform operations. The operations can include determining that operation of a location generation component of a first mobile computing device is associated with an anomaly, the first mobile computing device of a set of devices distinct from the computing device and associated with the premises management system.

According to an implementation of the disclosure, a means can be provided for generating, by a mobile computing device, an indicator of a location of the mobile computing device; determining, by an application that interfaces with a premises management system and is executing on the mobile computing device, that the indicator is associated with an anomaly; and providing, by a user interface of the mobile computing device to a user of the mobile computing device, a notice of the anomaly.

Additional features, advantages, and embodiments of the disclosed subject matter are set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
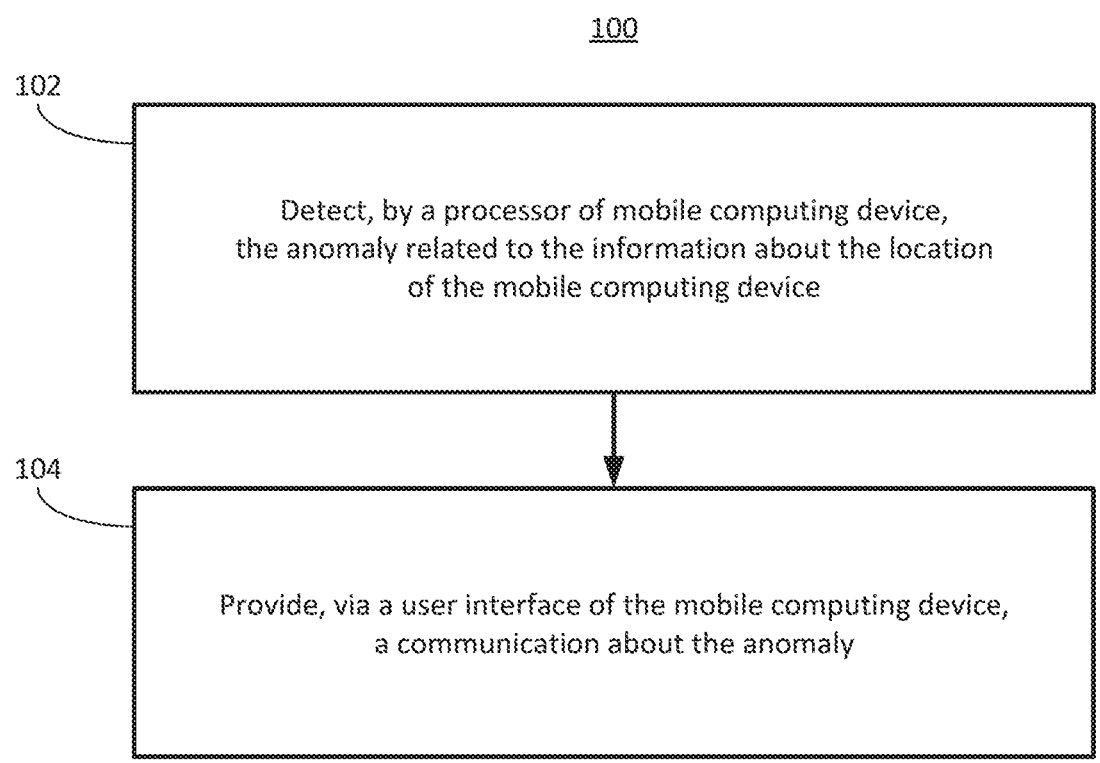
FIG. 1 is a flow diagram of an example of a method for detection of an anomaly related to information about a location of a mobile computing device according to an implementation of the disclosure.

According implementations of the disclosure, a premises management system may be a computer implemented, networked system of components that can control one or more components and subsystems of a premises. For example, a premises management system can control a home security system that manages one or more door sensors, window sensors, motion sensors, cameras, and related security components. The premises management system and/or the security system can operate in various modes depending on the occupancy of the home. For example a higher security mode may be entered when no occupants are determined to be at the home. Occupancy can be determined based on location indicators generated by one or more mobile computing devices the occupants typically carry with them. If a location indicator shows an occupant's mobile device to be in the home, then the security system can determine that the occupant is in the home. If a location generation component of an occupant's mobile device is not operating correctly, then the occupancy of the home may be incorrectly determined, and thus the security mode may be incorrectly determined.

Location generation components of mobile devices, such as location services, often operate in the background of a mobile device. Thus it may be difficult for a user to determine whether the mobile device is generating accurate location indicators, or whether location indicators are being generated at all. The premises management system may rely on the provided location indicators for the basis for determining the location of the mobile device, and thus it may similarly be difficult for the premises management system to determine whether the location indicators are accurate.

The improper operation of a location generation component may be linked to information about the mobile device, such as data about a state of the mobile device, the frequency that location indicators are generated, or the content of the location indicators. Linked information may be inconsistent with proper functioning of the location generation components of the mobile device or otherwise correlated with the improper functioning location generation components. Such linked information may be deemed an anomaly. By detecting an anomaly in information about a mobile device, it may be inferred that the location generation component is improperly functioning. Thus, by detecting an anomaly in information about a mobile device, the anomaly can be associated with the location generation component of the mobile device or a location indicator generated by the location generation component.

Implementations of the disclosure can provide for determining that a location identifier or operation of a location generation component of a mobile computing device is associated with an anomaly. These determinations may be made in implementations of the disclosure by the mobile device itself, such as via an application executing on the mobile device, or by a computing device in communication with a premises management system, such as where the computing device is a component of the premises management system or a server remote from the premises management system.

Implementations of the disclosure can take various actions in response to determining that a location identifier or operation of a location generation component of a mobile computing device is associated with an anomaly, according to implementations of the disclosure. For example, a user of the mobile device can be notified, the mobile device can be prevented from providing further location indicators to the premises management system, an instruction can be provided to the mobile device to remediate the improperly functioning location generation component, or instructions can be provided to the premises management system or subsystems and components thereof to remediate consequences of the improperly functioning location generation component.

In an implementation of the disclosure, an application may execute on a mobile computing device to interface with a premises management system. Through such an interface, a premises management system can be configured to control automatically various components included in the premises management system. Such automatic control of components of the premises management system can take into consideration a location of the mobile computing device, which can be interpreted by the premises management system as a proxy for a location of a user of both the mobile computing device and the premises management system. For example, if the premises management system receives information about the location of the mobile computing device that indicates that the mobile computing device, and by proxy the user, is different from a location of the components controlled by the premises management system (e.g., premises of the user), then the premises management system can cause one or more of the components of the premises management system to change state. For example, the premises management system can cause a security system of the premises management system to be armed. For example, the premises management system can cause a camera associated with the security system to commence recording. For example, the premises management system can cause a thermostat of the premises management system to reduce a temperature setting. For example, the premises management system can cause a notification about a condition of the premises (e.g., a potential intruder) to be communicated to the user and/or to a security agency.

Because automatic control of components of the premises management system can take into consideration the location of the mobile computing device, problems can arise if the information, received by the premises management system, about the location of the mobile computing device is erroneous. Aspects disclosed herein describe a method and a system for detection of an anomaly related to the information about the location of the mobile computing device. A component of the mobile computing device such as a location service can generate an indicator of a location of the mobile computing device. An application executing on the mobile computing device and interfacing with a premises management system may determine that the indicator of the location is associated with an anomaly. The mobile computing device may provide a communication such as a notice about the anomaly to a user of the mobile computing device via a user interface of the mobile computing device.

FIG. 1 is a flow diagram of an example of a method 100 for detection of an anomaly related to information about a location of a mobile computing device according to an implementation of the disclosure. In the method 100, at an operation 102, the anomaly related to the information about the location of the mobile computing device can be detected by a processor of the mobile device. The information about the location of the mobile computing device can be determined by a location generating component such as a location service that utilizes location data and/or triangulation and/or trilateration techniques applied to signals received from components in a cellular network; location data from a WiFi™ network, location data from a space-based navigation system (e.g., the Global Positioning System), or any combination thereof. In some implementations, the generation of the indicator of the location of the mobile computing device may be based on data received through an application programming interface of an operating system executing on the mobile computing device.

In an aspect of an implementation of the disclosure an anomaly may be a bug or other improper operation of an operating system of the mobile computing device or may be caused by a bug or improper operation of an operating system. In an aspect, the mobile computing device can be a tablet computer, a smartphone, or a personal digital assistant. For example, the mobile computing device can be one of a Nexus™ 5 smartphone, a Nexus™ 5x smartphone, a Nexus™ 6 smartphone, a Nexus™ 6p smartphone, or other Nexus™ model smart phone or tablet.

An indicator of a location of a mobile computing device may be associated with an anomaly, when, for example, the indicator is generated when the anomaly is present. In an aspect of an implementation of the disclosure, the anomaly can include one or more of a loss of receipt of a signal from which the location of the mobile computing device is determined, a deviation in the location of the mobile computing device from historical information about the location of the mobile computing device, or a collection of information that exhibits a pattern that indicates the deviation.

In some implementations, where the anomaly comprises a collection of data that exhibits a pattern, the pattern can include, within a duration of time, at least a first indicator that the location of the mobile computing device is a particular location, followed by a second indicator that the location of the mobile computing device is other than the particular location, followed by a third indicator that the location of the mobile computing device is the particular location. In some implementations the particular location may be defined by a geofence and the duration of time can be a specified period of time, such as between substantially four to substantially six minutes.

In some implementations an anomaly may include or be caused by a disabled location service of an operating system or a disabled wireless radio of the mobile computing device. For example, if the mobile device has an iOS® operating system, then the loss of receipt of the signal can be caused a disablement of a location services module of the iOS® operating system. For example, if the mobile device has an Android™ platform, then the loss of receipt of the signal can be caused by a cessation of power to a WiFi™ module of the Android™ platform.

In some implementations an anomaly may include inconsistencies between components of a mobile device. For example, the mobile device may provide a location indicator of a geofence crossing event, but the device may also indicate that there is no wireless connectivity.

Other anomalies may include, according to implementations of the disclosure, an expired credential of a mobile device such as a credential necessary to log into a wireless network or connect to an application account; an incorrectly registered premises location such that occupants are at home but their premises is indicated as located in a different city; or other erroneous events or inconsistent settings of devices, networks, or systems such as are suitable for the purposes of the disclosure.

Figure 2:
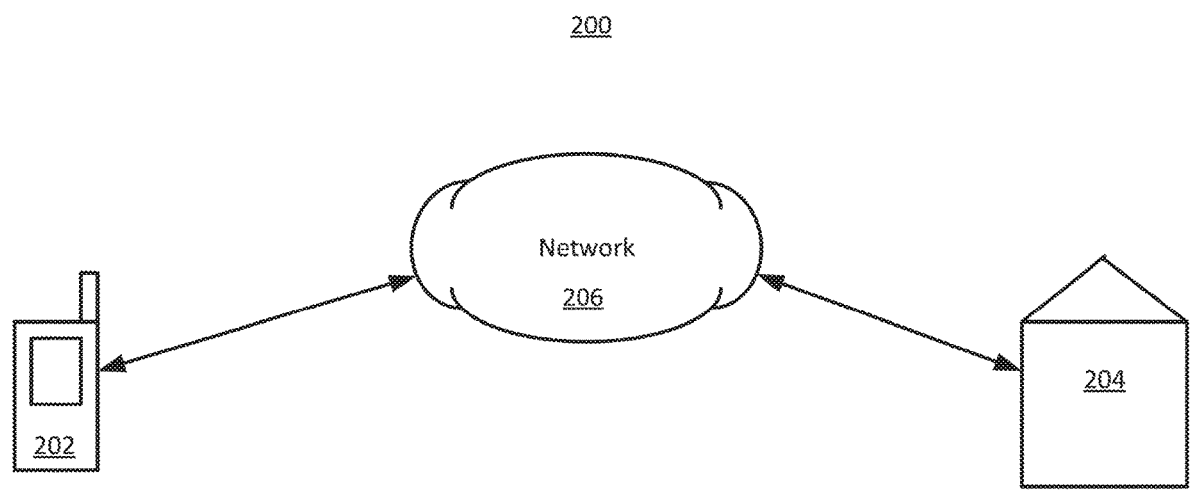
FIG. 2 is a diagram of an example of an environment in which detection of an anomaly related to information about a location of a mobile computing device can be performed according to an implementation of the disclosure.

FIG. 2 is a diagram of an example of an environment 200 in which detection of an anomaly related to information about a location of a mobile computing device can be performed according to an implementation of the disclosure. The environment 200 can include several elements such as, for example, a mobile computing device 202 and a premises management system 204. In an implementation, an element of the environment 200 can be communicatively connected to one or more other elements via a network 206.

The network 206 can be, for example, a telecommunications network configured to allow computers to exchange data. Connections between elements of the environment 200 via the network 206 can be established using cable media, wireless media, or both. Data traffic on the network 206 can be organized according to a variety of communications protocols including, but not limited to, the Internet Protocol Suite (Transmission Control Protocol/Internet Protocol (TCP/IP)), the Institute of Electrical and Electronics Engineers (IEEE) 802 protocol suite, the synchronous optical networking (SONET) protocol, the Asynchronous Transfer Mode (ATM) switching technique, or any combination thereof. In an embodiment, the network 206 can include the Internet, a cellular network, a WiFi™ network, or any combination thereof.

Through an interface (not illustrated) presented on the mobile computing device 202, one or more components of the premises management system 204 can be controlled automatically via one or more signals transmitted from the mobile computing device 202 to the premises management system 204 via the network 206. Additionally or alternatively, control of one or more aspects of one or more components of the premises management system 204 can be performed automatically in response to a location of the mobile computing device 202, which can be interpreted by the premises management system 204 as a proxy for a location of a user of both the mobile computing device 202 and the premises management system 204.

Figure 3:
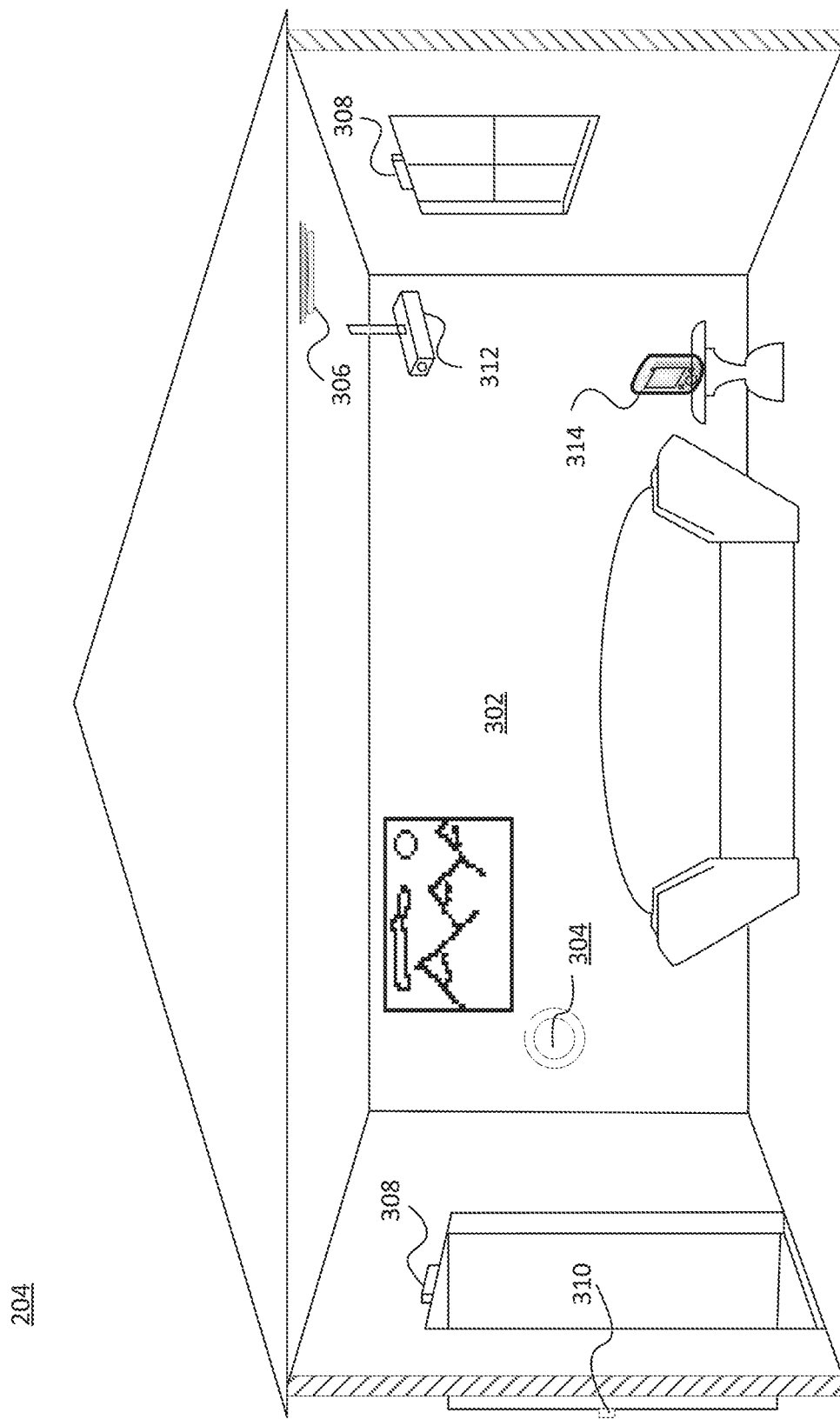
FIG. 3 is a diagram of an example of a premises management system according to an implementation of the disclosure.

FIG. 3 is a diagram of an example of the premises management system 204 according to an implementation of the disclosure. The premises management system can be installed within premises that include a house or other structure 302. The system 204 can implement subsystems, including a security system, via multiple types of premises management devices, such as one or more intelligent, multi-sensing, network-connected thermostats 304, one or more intelligent, multi-sensing, network-connected hazard detection units 306, one or more intelligent, multi-sensing, network-connected entry detection units 308, one or more network-connected door handles 310, one or more intelligent, multi-sensing, network-connected cameras 312, one or more intelligent, multi-sensing, network-connected controller devices 314, or any combination thereof.

Data from any of these premise management devices can be used by the security system, as well as for the respective primary functions of the premise management devices. For example, the security system can manage the arming, disarming, and activation of alarms and other security aspects of the premises, and other systems of the premises management system 204 can handle aspects such as light, temperature, and hazard detection of the premises. The premises management system 204 can leverage data obtained in one subsystem to improve the functionality of another subsystem.

For example, data from the sensors can be used to determine the occurrence of a security breach or security related event, such as entry through a window of the premises, lengthy presence of an individual in an unusual location and an unusual time, or tampering with a lock of a door of the premises, etc. Upon the occurrence of such an event, the security system can determine, based on any of various algorithms, that an alarm is warranted and enter an alarm mode, which can include automatically notifying a third party monitoring service as well as operating components of the system to provide visual and/or audible alerts, such as a siren sound, repeated beeping sound, or flashing lights.

Additionally, the security system can determine where a security breach has occurred and thereafter track the location of the unauthorized party, as well as the locations of authorized parties within and/or around the premises. Additionally, in view of the high stress levels that can accompany experiencing an unauthorized intrusion, the security system can announce the location of the security breach and the location of the unauthorized party within the premises. In so doing the authorized occupants are automatically warned of which locations in/around the premises to avoid and the unauthorized party is simultaneously deterred from further advance due to the clear notice to the unauthorized party that he/she is being tracked. Alternatively, the location of the unauthorized party can be announced only to select devices so as to inform an authorized user while leaving the unauthorized party unaware that he/she is being tracked.

The security system can be operable to function in any of various modes or states. For example, security system modes can include "stay", "away", "vacation", "home", and "sleep" modes. In a "stay" mode the security system can operate under the assumption that authorized parties are present within the premises but will not be entering/leaving without notifying the system; therefore data from certain interior sensors can be given lower weight in determining whether an unauthorized party is present. In an "away" mode the security system can operate under the assumption that no authorized parties are in the premises; therefore data from all sensors, interior and exterior, can be accorded high weight in determining whether an unauthorized party is present. In a "vacation" mode the security system can operate under the assumption that no authorized parties are in the premises during a specified period of time and/or with the exception of certain specified parties such as pet sitters or house-watchers; therefore data from all sensors, interior and exterior, can be accorded high weight in determining whether an unauthorized party is present during the specified period of time and with limited exceptions for parties having specific identifying information. In a "home" mode the security system can operate under the assumption that authorized parties are within the premises and will be freely entering/leaving the premises without notifying the system; therefore data from certain sensors (interior and exterior) can be accorded low weight in determining whether an unauthorized party is present. In a "sleep" mode the security system can operate under the assumption that authorized parties are within the premises and will not be freely entering/leaving the premises without notifying the system; however because the occupants may not be conscious that data from certain interior sensors can be accorded low weight but certain exterior sensors can be accorded high weight in determining whether an unauthorized party is present. It should be understood that these modes are merely examples and can be modified, removed, or supplemented by other modes. In some implementations, the security system may execute as a component of the premises management system, and thus these modes may be modes of the premises management system and function similarly.

Additionally, the security system can function in any of various alarm states. For example, in a "green" or "low" alarm state the security system can operate under the assumption that all is well and no unauthorized parties have been detected within/around the premises. In a "yellow" or "medium" alarm state the security system can operate under the assumption that an unauthorized party is potentially present in or around the premises. In this state certain sensor data can be analyzed differently or additional confirmations of authorization, such as entering a code, can be required of to avoid escalation to a higher alarm state. In a "red" or "high" alarm state the security system can operate under the assumption that an unauthorized party has been detected on the premises and preventive measures can be taken, such as notifying a third party monitoring service and/or activating an alarm and announcement, as will be described later. It should be understood that greater or fewer gradients of alarm state can be included. Hereinafter, a heightened alarm can refer to an alarm state above the low alarm state.

At a high level, the premises management system 204 can be configured to operate as a learning, evolving ecosystem of interconnected devices. New premises management devices can be added, introducing new functionality, expanding existing functionality, or expanding a spatial range of coverage of the system. Furthermore, existing premises management devices can be replaced or removed without causing a failure of the system 204. Such removal can encompass intentional or unintentional removal of components from the system 204 by an authorized user, as well as removal by malfunction (e.g., loss of power, destruction by intruder, etc.). Due to the dynamic nature of the system, the overall capability, functionality and objectives of the premises management system 204 can change as the constitution and configuration of the premises management system 204 change.

In order to avoid contention and race conditions among the interconnected devices, certain decisions, such as those that affect the premises management system 204 at a system level or that involve data from multiple sources, can be centralized in the aforementioned "brain" component. The brain component can coordinate decision making across the system 204 or across a designated portion thereof. The brain component is a system element at which, for example, sensor/detector states can converge, user interaction can be interpreted, sensor data can be received, and decisions can be made concerning the state, mode, or actions of the system 204. Hereinafter, the system 204 brain component can be referred to as the "primary system processor" such as is shown with respect to element 1410 in FIG. 14 below. The function of primary system processor can be implemented in the controller device 314, for example, hard coded into a single device, or distributed virtually among one or more premises management devices within the system using computational load sharing, time division, shared storage, or other techniques.

However implemented, the primary system processor can be configured to control subsystems and components of the premises management system 204, such as, for example, the disclosed security system and/or a system of a "smart home environment" as discussed later portions of this disclosure. Furthermore, the primary system processor can be communicatively connected to control, receive data from, or transmit data to premises management devices within the system, as well as receive data from or transmit data to devices/systems external to the system 204, such as third party servers, cloud servers, mobile devices, and the like.

In the embodiments disclosed herein, each of the premises management devices can include one or more sensors. In general, a "sensor" can refer to any device that can obtain information about its local environment and communicate that information in the form of data that can be stored or accessed by other devices and/or systems. Sensor data can form the basis of inferences drawn about the sensor's environment. For example, the primary system processor can use data from a plurality of sensors, e.g., including entry detection unit 308, to determine whether an unauthorized party is attempting enter the house 302 through a window.

A brief description of sensors that may be included in the premises management system 204 follows. Examples provided are not intended to be limiting but are merely provided as illustrative subjects. The premises management system 204 can use data from the types of sensors in order to implement features of a security system. The premises management system 204 can employ data from any type of sensor that provides data from which an inference can be drawn about the environment in or around a premises, such as house 302.

Generally, sensors can be described by the type of information they collect. For example, sensor types can include motion, smoke, carbon monoxide, proximity, temperature, time, physical orientation, acceleration, location, entry, presence, pressure, light, sound, and the like. A sensor also can be described in terms of the particular physical device that obtains the environmental information. For example, an accelerometer can obtain acceleration information, and thus can be used as a general motion sensor and/or an acceleration sensor. A sensor also can be described in terms of the specific hardware components used to implement the sensor. For example, a temperature sensor can include a thermistor, thermocouple, resistance temperature detector, integrated circuit temperature detector, or combinations thereof.

A sensor further can be described in terms of a function or functions the sensor performs within the premises management system 204. For example, a sensor can be described as a security sensor when it is used to determine security events, such as unauthorized entry.

A sensor can be operated for different functions at different times. For example, the premises management system 204 can use data from a motion sensor to determine how to control lighting in the house 302 when an authorized party is present and use the data as a factor to change a security system mode or state on the basis of unexpected movement when no authorized party is present. In another example, the premises management system 204 can use the motion sensor data differently when a security system mode is in an "away" mode versus a "home" state, i.e., certain motion sensor data can be ignored while the system is in a "home" mode and acted upon when the system is in an "away" mode.

In some cases, a sensor can operate as multiple sensor types sequentially or concurrently, such as where a temperature sensor is used to detect a change in temperature, as well as the presence of a person or animal. A sensor also can operate in different modes (e.g., different sensitivity or threshold settings) at the same or different times. For example, a sensor can be configured to operate in one mode during the day and another mode at night. As another example, a sensor can operate in different modes based upon a mode or the disclosed security system, state of the premises management system 204, or as otherwise directed by the primary system processor.

Multiple sensors can be arranged in a single physical housing, such as where a single device includes movement, temperature, magnetic sensors such as magnetometers or compasses, and/or other sensors. Such a housing can also be referred to as a sensor, premises management device, or a sensor device. For clarity, sensors can be described with respect to the particular functions they perform and/or the particular physical hardware used.

Returning to FIG. 1, as described above, in an aspect, the anomaly can include a collection of information that exhibits a pattern that indicates a deviation in the location of the mobile computing device from historical information about the location of the mobile computing device. For example, the pattern can include, within a duration of time, at least a first indication that the location of the mobile computing device is a particular location, followed by an indication that the location of the mobile computing device is other than the particular location, followed by a second indication that the location of the mobile computing device is the particular location. In a realization, the particular location can be defined by a geo-fence. In a realization, the duration of time can be five minutes.

For instance, if: (1) the particular location is the premises of the user and (2) control of one or more aspects of one or more components of a premises management system is performed automatically in response to the location of the mobile computing device, then having a situation in which the mobile computing device receives an indication that the location of the mobile computing device is other than the premises of user (when, in actuality, the location of the mobile computing device is the premises of the user) can cause the premises management system to change a state of one or more components of the premises management system. For example, with reference to FIG. 3, the premises management system 204 can cause: (1) the security system of the premises management system 204 to be armed, (2) the camera 312 associated with the security system to commence recording, (3) thermostat 304 to reduce a temperature setting, (4) a notification about a condition of the premises (e.g., a potential intruder) to be communicated to the user and/or to a security agency, (5) the like, or (6) any combination thereof. Such a situation can cause problems if the location of the mobile computing device, and by proxy the location of the user, in actuality is the premises of the user.

Returning to FIG. 1, in the method 100, at an operation 104, a communication about the anomaly such as a notice can be provided via a user interface of the mobile computing device, according to an implementation of the disclosure. The communication can be visual, audible, tactile, or any combination thereof.

In an aspect of an implementation of the disclosure, in response to a first instance of the operation 104, occurrence of a second instance of the operation 104 can be delayed for a duration of time. In a realization, the duration of time can be seven days. For instance, if in a first instance in which the anomaly related to the information about the location of the mobile computing device is detected and the communication about the anomaly associated with the first instance is provided, in a second instance in which the anomaly related to the information about the location of the mobile computing device is detected, the communication about the anomaly associated with the second instance can occur after a delay from a time at which the communication about the anomaly associated with the first instance is provided.

Figure 4:
FIG. 4 is a diagram of an example of an application-provided interface, of a mobile computing device, used to provide a recommendation for addressing an anomaly according to an implementation of the disclosure.

In an aspect of an implementation of the disclosure, the communication about the anomaly can include a recommendation for addressing or remediating the anomaly. For example, if the anomaly includes a loss of receipt of a signal from which the location of the mobile computing device is determined, then the recommendation can be to restore reception of the signal. For instance, if the mobile device has an iOS® operating system, then the recommendation can be to enable a location services module of the iOS® operating system. For instance, if the mobile device has an Android™ platform, then the recommendation can be to restore power to a WiFi™ module of the Android™ platform. For example, if control of one or more aspects of one or more components of a premises management system is performed automatically in response to the location of the mobile computing device, then the recommendation can include a suggestion to change a setting of the one or more components of the premises management system controlled through an application-provided interface of the mobile computing device. FIG. 4 is a diagram of an example of an application-provided interface 400, of a mobile computing device, used to provide a recommendation for remediating or otherwise addressing an anomaly, according to an implementation of the disclosure.

Returning to FIG. 1, in an aspect, the operation 104 can be in response to an activation, by the mobile computing device, of an application-provided interface configured to control one or more components of a premises management system. For instance, if the method 100 is implemented by an application operating on the mobile computing device, then the application can be operated to continually monitor the information about the location of the mobile computing device to detect an anomaly, but communication about a detected anomaly can be in response to an activation, by the mobile computing device, of an application-provided interface configured to control one or more components of a premises management system. Such activation of the application-provided interface may occur later than a time at which the anomaly was detected.

Figure 5:
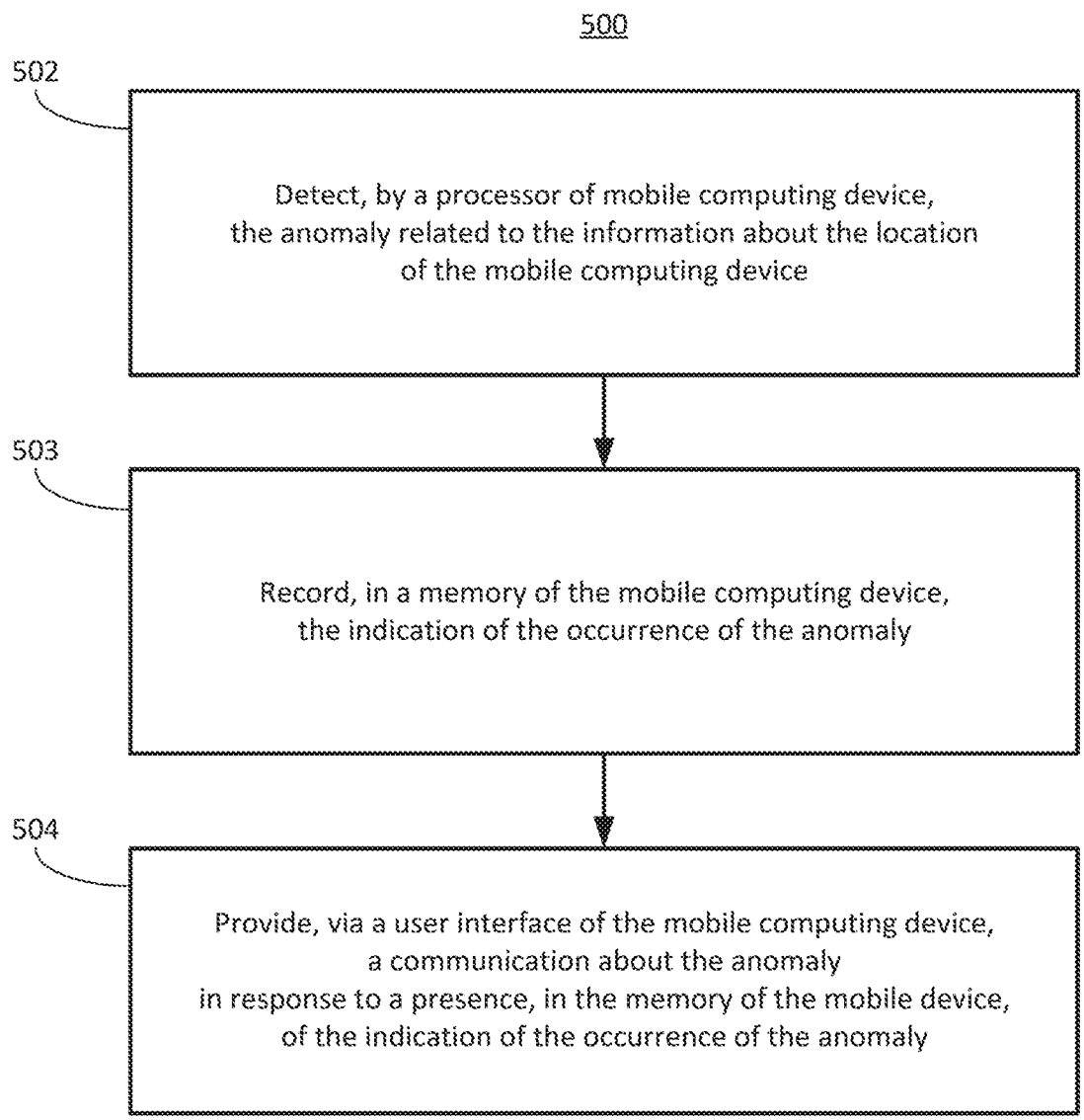
FIG. 5 is a flow diagram of an example of a method for detection of an anomaly related to information about a location of a mobile computing device in which an indication of an occurrence of the anomaly is recorded in a memory according to an implementation of the disclosure.

FIG. 5 is a flow diagram, according to an implementation of the disclosure, of an example of a method 500 for detection of an anomaly related to information about a location of a mobile computing device in which an indication of an occurrence of the anomaly is recorded in a memory. In the method 500, at the operation 502, the anomaly related to the information about the location of the mobile computing device can be detected by the processor of the mobile device. At an operation 503, the indication of the occurrence of the anomaly can be recorded in the memory of the mobile computing device. At an operation 504, the communication about the anomaly can be provided, via the user interface of the mobile computing device, in response to a presence, in the memory of the mobile device, of the indication of the occurrence of the anomaly.

In an example, according to an implementation of the disclosure, method 500 may be implemented by an application operating on the mobile computing device. The application can be operated to continually monitor the information about the location of the mobile computing device to detect an anomaly. If the anomaly is detected, then an indication of the occurrence of the anomaly can be recorded in a memory of the mobile computing device. Communication about a detected anomaly can be in response to a presence, in the memory of the mobile device, of the indication of the occurrence of the anomaly. Such a communication may occur later than a time at which the anomaly was detected.

Figure 6:
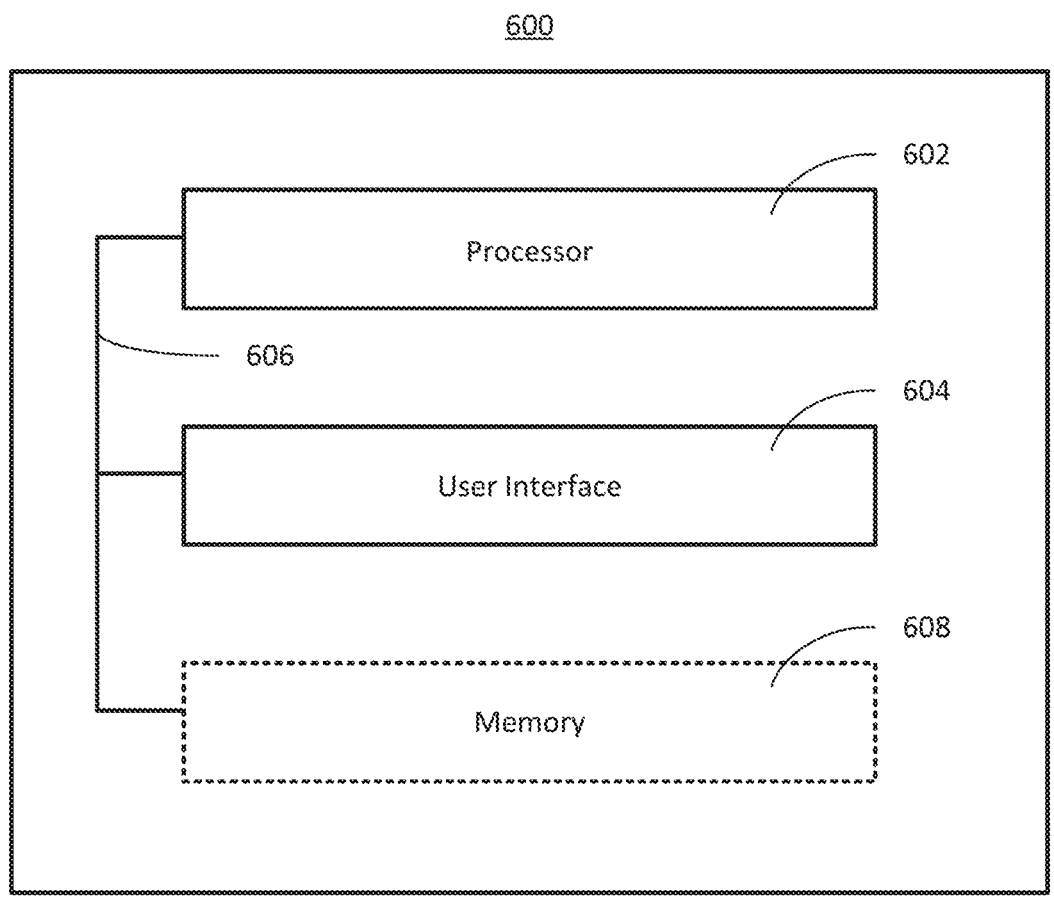
FIG. 6 is a block diagram of an example of a system for detection of an anomaly related to information about a location of a mobile computing device according to an implementation of the disclosure.

FIG. 6 is a block diagram of an example of a system 600 for detection of an anomaly related to information about a location of a mobile computing device according to an implementation of the disclosure. The system 600 can include, for example, a processor 602, a user interface 604, and a bus 606. The processor 602 can include any processing circuit operative to control an operation of the system 600. The user interface 604 can be any type of interface through which a user of the system 600 can input and/or receive information. The information can be communicated through a visual technique, an audible technique, a tactile technique, or any combination thereof. The bus 606 can be coupled to the processor 602 and the user interface 604, and can be configured to facilitate communications among these components. Other devices and components (not illustrated) can be included in the system 600.

According to an implementation of the disclosure, processor 602 can be configured to detect the anomaly related to the information about the location of the mobile computing device. The anomaly may be any type of anomaly discussed herein or otherwise suitable for the purposes of the disclosure. In an aspect, the processor 602 and the user interface 604 can be configured to provide, in response to an activation of an application-provided interface configured to control at least one component of a premises management system, a notice indicating the anomaly. In an aspect of the disclosure, the system 600 can include a memory 608. The memory 608 can be configured to record an indication of an occurrence of the anomaly. In this aspect, the processor 602 and the user interface 606 can be configured to provide the communication about the anomaly, in response to a presence, in the memory 608, of the indication of the occurrence of the anomaly. For instance, if the system 600 is implemented by an application operating on the mobile computing device, then the application can be operated to continually monitor the information about the location of the mobile computing device to detect an anomaly. If the anomaly is detected, then an indication of the occurrence of the anomaly can be recorded in the memory 608. Communication about a detected anomaly can be in response to a presence, in the memory 608, of the indication of the occurrence of the anomaly. Such a communication may occur later than a time at which the anomaly was detected. Generally, the components of system 600 may implement any of the methods and procedures disclosed herein, such as those discussed with respect to FIGS. 1-5

Premises management systems may maintain accounts linking each of a set of devices such as mobile computing devices. For example, a premises management system may maintain a family account that includes a mobile device belonging to or otherwise associated with each member of the family living at a premises, such as a home. The premises management system may be in communication with each of the mobile devices in the family account and may be able to determine that one of the mobile devices is not properly performing an operation associated with the premises management system. For example, operations executing on the mobile devices may provide geofence location data to the premises management system and used to make determinations about the family's home. The premises management system may receive an indicator from a particular mobile device that the particular mobile device has traversed a geofence boundary over a threshold number of times, within a threshold amount of time. As a result of exceeding these thresholds, the premises management system may determine that the particular mobile device is operating anomalously. The premises management system may select each other mobile device registered to the family account and provide to the selected devices a notice including an indicator that the particular mobile device is operating anomalously. Furthermore, while the particular mobile device is operating anomalously, the premises management system may refrain from using data received from the particular mobile device when making determinations of the occupancy status of the home, such as whether all family members are home or away from home as discussed above.

Figure 7:
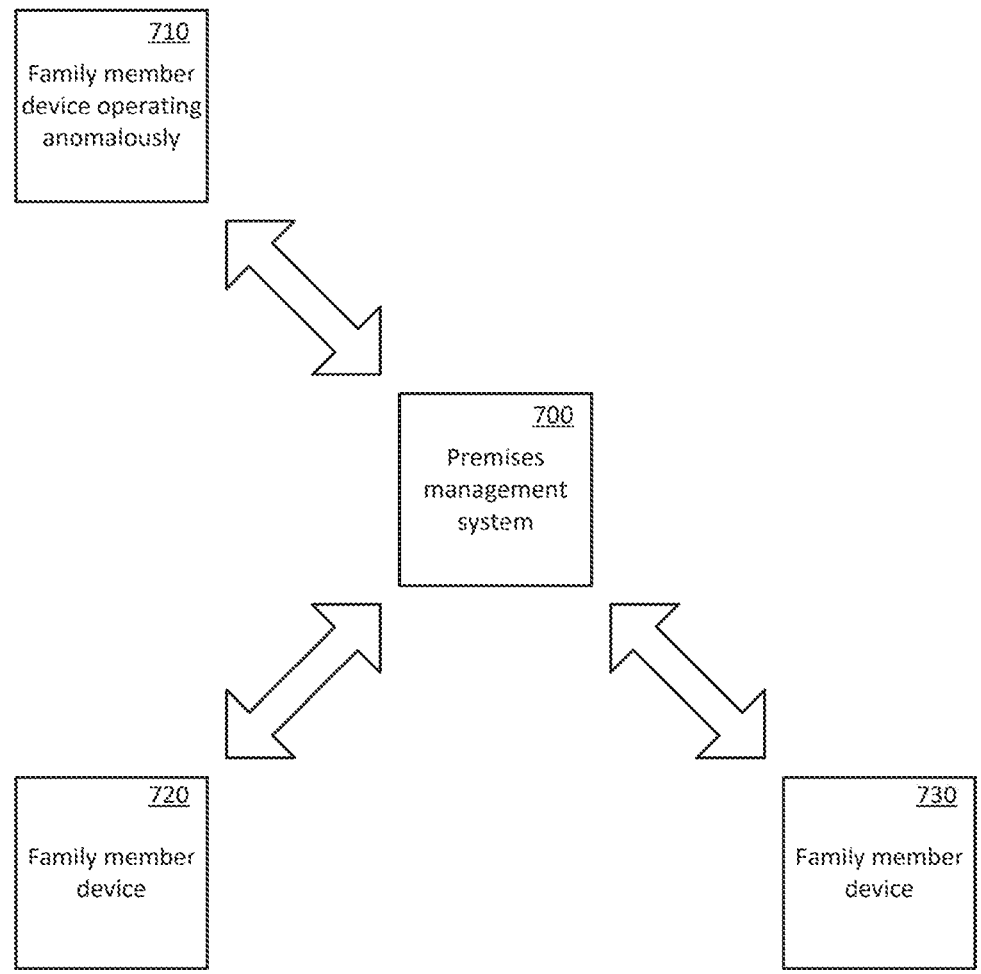
FIG. 7 shows a block diagram of components of a premises management system and computing devices linked to the premises management system according to an implementation of the disclosure.

A premises management system may include a computing device that may communicate with one or more other devices, such as mobile computing devices. For example, FIG. 7 shows, according to an implementation of this disclosure, a block diagram of components of a premises management system and computing devices linked to the premises management system. Premises management system 700 may include a computing device, which may be a home monitoring hub or controller, such as controller 1412 described below with respect to FIG. 14, and/or a remote system, such as remote system 1408 described below with respect to FIG. 14.

The premises management system may be in communication with one or more other mobile devices 710, 720, 730. Mobile devices 710, 720, 730 may be, for example, mobile computing devices, such as smart phones, tablets, or laptops; wearable computing devices, such as watches, glasses, or computing devices integrated into shoes or clothing; or any mobile device providing the functionality of a "sensor" such as any of the sensor devices and related components described below with respect to FIGS. 13-15.

Figure 13:
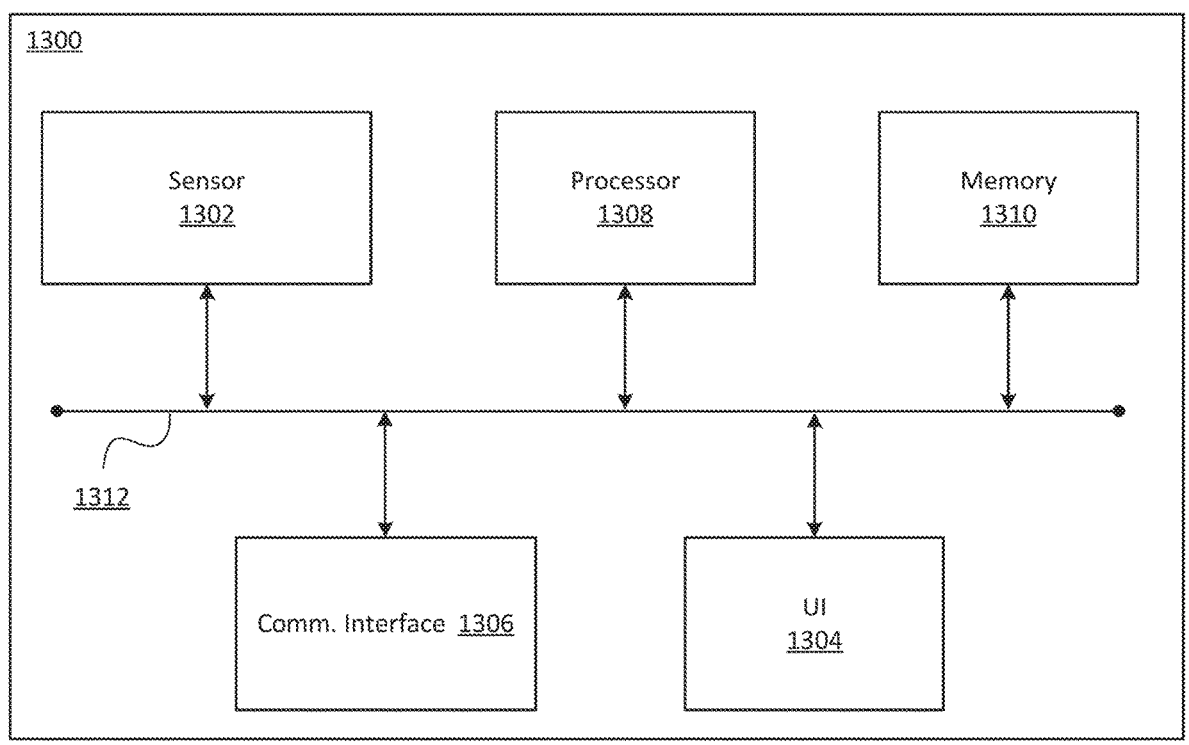
FIG. 13 is a block diagram of an example of a premises management device according to an implementation of the disclosure.
Figure 14:
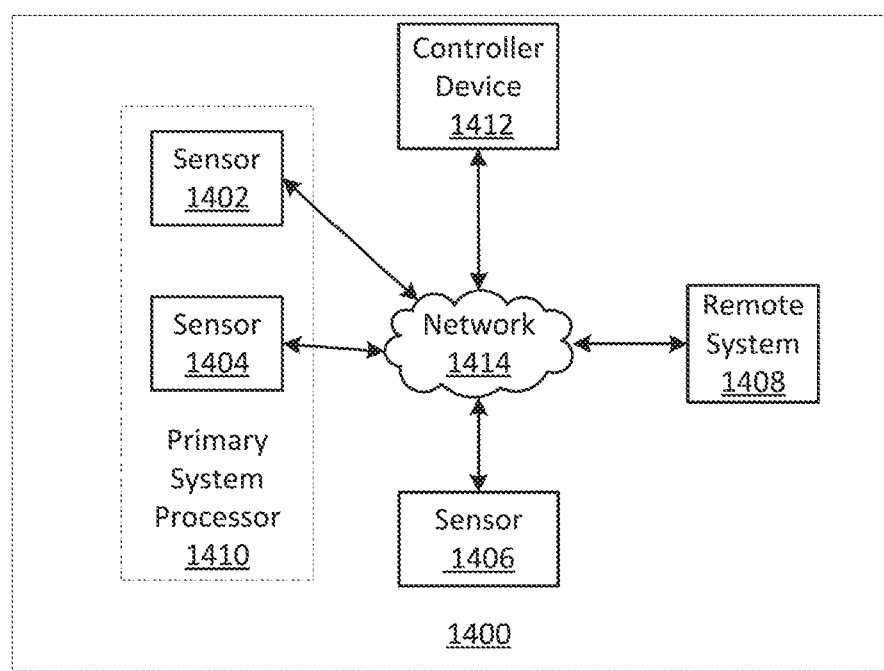
FIG. 14 is a block diagram of an example of a premises management system according to an implementation of the disclosure.
Figure 15:
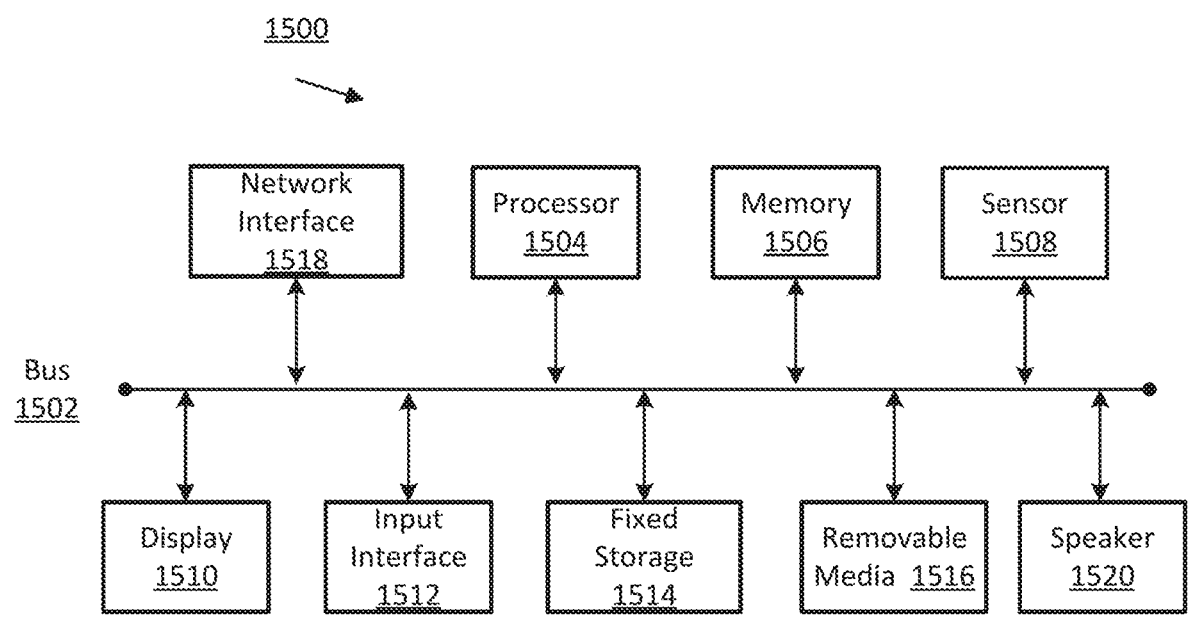
FIG. 15 is a block diagram of an example of a computing device suitable for implementing certain devices illustrated in FIGS. 1-14 according to an implementation of the disclosure.

Generally, implementations of this disclosure may be partially or completely incorporated within a "smart home environment", as is described in other portions of this disclosure such as with respect to FIGS. 13-15. For example, in addition to communicating with mobile devices 710, 720, 730, premises management system 700 may communicate with various intelligent, multi-sensing, network-connected devices, which can integrate seamlessly with each other and/or with a central server or cloud-computing system, such as any of the sensor devices and related components described below with respect to FIGS. 13-15. By incorporating or communicating with such components, premises management system 700 may provide a variety of functionality, such as home security, temperature control, fire detection, hazardous substance detection, or any other functionality suitable for the purposes of this disclosure.

In an implementation of the disclosure, mobile devices 710, 720, and 730 may each be associated with premises management system 700. For example, premises management system 700 may maintain an account on a computing device in communication with the premises management system 700, such as computing device local to the premises or a remote system, such as a remote server. This account may include a designator of an association between members, such as a family account and include accounts for each family member who lives in a particular home. Each family member may register her computing device with the family account. For example, a parent may own or otherwise be associated with mobile device 730, the parent's older daughter may own or otherwise be associated with mobile device 720, and the parent's younger daughter may own or otherwise be associated with mobile device 710. Each mobile device 710, 720, 730 may be a mobile device the family member typically carries with them, or any of the other mobile computing devices discussed herein.

A family member may access the family account through, for example, an interface displayed on a webpage or mobile application. The family member may be required to enter a login, password, or other credential that may be authenticated by a remote server of the premises management system. The family member may provide or verify identifying information for their associated mobile device. For example, the older daughter may enter the phone number of mobile device 720, or an application installed on mobile device 720 may obtain identifying information and communicate such information to the family account. As another example, a local component of premises management system 710 may access a local wireless network to which mobile device 720 is connected, retrieve its identifying information, and present such information for verification in the interface of the family account.

In addition to family members, devices belonging to other individuals may be registered with the family account. For example, a child care provider's mobile device may be added or a lawn care provider's mobile device may be added. Permissions or certain functionality associated with accounts under the family account may be configurable. For example, detection of certain registered mobile devices within the home may generally disarm a security system. However this disarming functionality may be disabled for the child care provider's mobile device except when the child care provider's device is detected at a time and/or place that corresponds to a child care schedule accessible by the premises management system.

In an implementation of this disclosure, certain functionality of a premises management system, such as premises management system 700, may be triggered by employing geofencing techniques to determine an occupancy status of a home, such as whether some or all occupants of a premises are either "home" or "away" or whether the premises is in "vacation mode", "stay mode", or "sleep mode" as discussed above with respect to FIGS. 1-5. The location of an occupant may be based on the location of their mobile device. For example, all occupants of a home, such as the mother, oldest daughter, and youngest daughter described above, may have mobile devices, such as mobile devices 710, 720, 730, registered with a family account of premises management system 700. Each mobile device 710, 720, 730 may perform operations that provide data related to the location of the mobile device. For example, a mobile device may have a GPS sensor that may provide location data based on a GPS determined coordinate. A mobile device may have a radio frequency identification (RFID) or other near field communications (NFC) sensor, Bluetooth sensor, or Wi-Fi sensor that may provide location data that may be determined based on the proximity of a wireless network node to the sensor and the range of the respective wireless protocol or standard employed by the senor. A mobile device perform operations that provide location data based on the location of the nearest cellular network node, such as a base station, to the mobile device and a range of the respective protocol or standard, such as the cell size currently being accessed on the cellular network.

Mobile devices 710, 720, 730 may transmit location data such as that described above for the mobile devices 710, 720, 730 to the premises management system 700. This location data may be used to represent the location of each respective family member. Such location data may be compared to predetermined location data for the boundary of the home. If a family member's location data is outside predetermined boundary location data for the home, then that family member may be determined to be away. Similarly, if all the family members' location data is outside the predetermined boundary location data for the home, then all family members may be determined to be away.

In another implementation of this disclosure, various intelligent, multi-sensing, network-connected devices, which can integrate seamlessly with each other and/or with a central server or cloud-computing system, such as any of the sensor devices and related components described below with respect to FIGS. 13-15, may provide location data to the premises management system 700. For example, camera sensors that are part of the smart home environment may determine a location of a family member by identifying the family member through facial recognition procedures and stored predetermined location data for the location of the camera sensor. In another example, audio sensors that are part of the smart home environment may determine a location of a family member by identifying the family member through voice recognition procedures and stored predetermined location data for the location of the audio sensor and the range of the audio sensor.

In another implementation, a family member may be identified by components of premises management system 700 by detecting a wireless identifier transmitted by her mobile device. When the wireless identifier of a family member's mobile device is identified on one side of a boundary of the home and then detected at a later time on the other side, or not detected on the other side for a threshold period of time, then the family member may be determined to have traversed the boundary. If such boundary represents the outer boundary of the home, then the family member may be determined to be away.

In implementations of this disclosure, systems of a premises management system and procedures within such systems may be triggered when one or more occupants are determined to be away. Such systems and procedures may incorporate various intelligent, multi-sensing, network-connected devices, which can integrate seamlessly with each other and/or with a central server or cloud-computing system, such as any of the sensor devices and related components described below with respect to FIGS. 13-15. For example, an alarm system may be triggered when one or more occupants are determined to be away, camera sensors of a home monitoring system may be activated when one or more occupants or all adult occupants are determined to be away, a thermostat setting may be adjusted such that a heating or cooling system is caused to activate or deactivate when some or all occupants are determined to be away. Conversely, in implementations of this disclosure, systems of a premises management system and procedures within such systems may be triggered when one or more occupants are determined to be home. For example, cameras within a child occupant's room in a home monitoring system may be triggered when the child is determined to be home, door and window lock sensors of a home security system may be triggered when one or more occupants are determined to be home and a time and date data are received that correspond to the trigger, or active infrared sensors of a sleep monitoring system may be triggered when an occupant is determined to be home and family account data is stored that indicates the occupant has a sleeping disorder and is to be monitored.

In light of the above, it may be beneficial for a premises management system to determine when an operation of a family member's mobile device associated with home and away determinations is performing anomalously. For example, if a family member's mobile device is providing a location signal indicating it is within a boundary of the home, but the family member has left the home, the security system may not be activated because the premises management system may erroneously determine that the family member is home. In another example, an operation of a mobile device of a family member may not have updated the mobile device's location since before the family member arrived home. Thus the premises management system may erroneously determine the family member is away, and as a result a camera sensor of a home monitoring system may remain triggered and record the family member when they are home without the family member's knowledge.

Anomalous location indicating operations of a mobile device may be determined in a variety of ways. For example, if a request related to an location identifying operation is provided to a mobile device and a response is not received within a predetermined threshold period of time, then the expiration of the threshold period of time may be an indicator that the operation is not taking place. As a result of this indicator, it may be determined that the mobile device is operating anomalously. This may occur in circumstances where, for example, a wireless or cellular network interface is disabled on the device, the device is powered down, or there is not network access for the device.

In an implementation of the disclosure, a request to perform an operation associated with geofencing may be provided to the mobile device. For example, the request may include an instruction to perform an operation to provide a determination of whether a geofence has been crossed a threshold number of times within a threshold time period. These thresholds may represent anomalous operating conditions and may have threshold values, for example of at least three traversals in five minutes. Determining that the anomalous condition has been met may result in determining the device is operating anomalously.

In an implementation of the disclosure, the request may include an instruction to provide a mobile device identifier to the closest wireless network node, to determine a distance from the closest Wi-Fi access node, or to determine a GPS location. These operations may result in data indicating a location of the mobile device or data that may be used with data about the location of other network components to calculate the location of the mobile device. For example the location of a wireless access node may be known and the maximum distance from the node may be known based on the specification of the network protocol being employed. Location data such as this may be compared to other data indicating a location of the mobile device. For example, a network identifier of the mobile device may currently be detected within the home, whereas GPS or cellular network data may indicate the device is located outside of the home. These two locations may be compared and determined to be incongruous, for example, they may be different by more than a threshold amount. A determined incongruity may be a condition that results in the mobile device being determined to be operating anomalously.

Other sensor devices and related components of the smart home environment may also be used to determine incongruity between detected locations of the mobile device. For example, facial recognition procedures or gait recognition procedures executing on a camera device in the home may determine a family member is present in the home, or voice recognition procedures executing on an audio sensor device may recognize the family member is in the home. These determinations may be compared to data received from the mobile device indicating the mobile device is located outside of the home. Such a determined incongruity may result in the mobile device being determined to be operating anomalously.

In another example, a request may be provided to a device to determine whether location related features of the device are enabled. For example the request may include an instruction to provide an indicator of whether a wireless location service is enabled on the device or whether a Wi-Fi radio is enabled on the device. Responses to such requests may be received and compared to anomalous operating conditions such as conditions that the location service is disabled or that the Wi-Fi radio is disabled when a location operation only functions over the Wi-Fi network. If such a conditions are satisfied, then the device may be determined to be operating anomalously.

Anomalous operations may not be detectable to a family member using the device because, for example, they involve a background operations on the mobile device, the anomalously operating mobile device is turned off or locked, the screen is malfunctioning, the battery is discharged, or a network interface is malfunctioning or network connectivity is otherwise lost. Therefore, in some implementations, it may be beneficial to provide notifications to the other mobile devices registered to the family account of the anomalously operating device. In other implementations, a notification may be provided to all devices registered to the family account, including the device operating anomalously.

Figure 8:
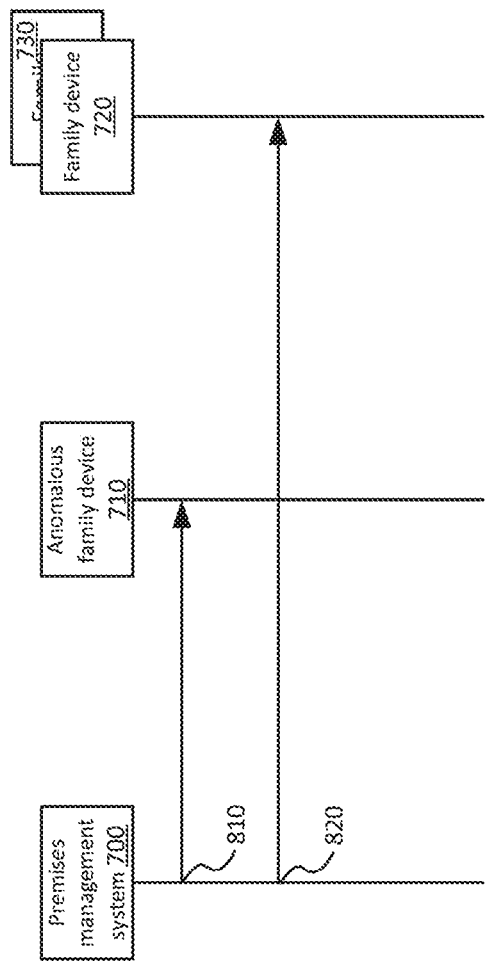
FIG. 8 shows a sequence diagram for providing notifications to devices associated with a premises management system according to an implementation of the disclosure.

In an implementation of this disclosure, a premises management system may provide notifications to each mobile device associated with a premises management system when a particular mobile device associated with the premises management system is determined to be operating anomalously. For example, FIG. 8 shows a sequence diagram for providing notifications to devices associated with a premises management system according to an implementation of this disclosure. At 810, premises management system 700 may transmit a request to mobile device 710. For example, the request may include an instruction to transmit location data to the premises management system. A threshold period of time may expire after the request is provided. For example no response may be received within nine minutes of transmitting the request. In response to the expiration of this threshold period of time, at 820 a notification may be provided to each other mobile device 720, 730 registered with the family account. This notification may instruct each other mobile device to display a push notification to the interface of each mobile device that alerts the family member of the anomalous operation of mobile device 710.

Figure 9:
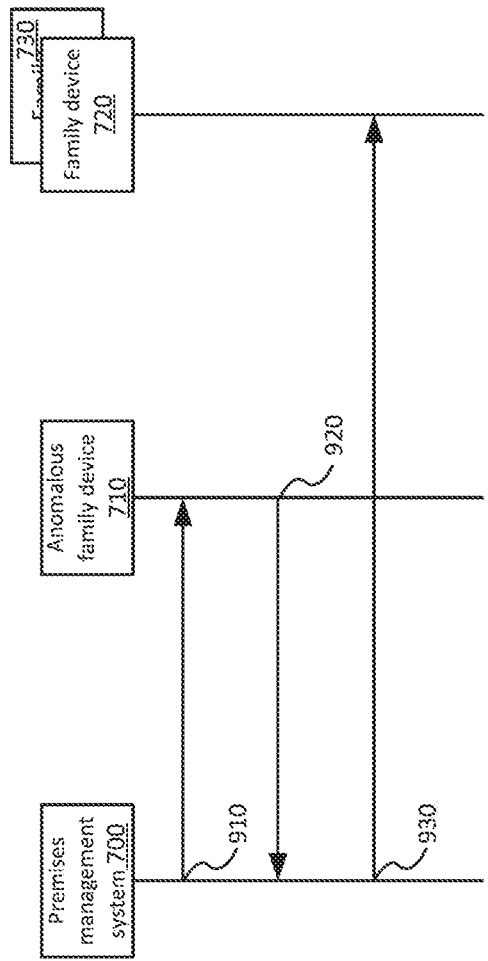
FIG. 9 shows a sequence diagram for providing notifications to devices associated with a premises management system according to an implementation of the disclosure.

In another implementation of this disclosure, premises management system may determine a mobile device is operating anomalously based on a response from the anomalous device. For example, FIG. 9 shows a sequence diagram for providing notifications to devices associated with a premises management system according to an implementation of this disclosure. At 910 premises management system 700 may provide a request to mobile device 710 belonging to a family member of the family account. This request may be, for example, for mobile device 710 to provide an indicator of the state of an operation of the mobile device related to location. For example the request may be for an indicator of whether location services on the mobile device have been enabled or to determine a location of the mobile device and provide an indicator of that location. At 920, the mobile device 710 may provide a response to premises management system 700. For example the response may be an indicator of the operation, such as an indicator that location services have not been enabled, or an indicator of the location data that is the result of the location determination operation.

Premises management system 700 may determine, based on the response at 920, that mobile device 710 is operating anomalously. Mobile device 710 may be operating anomalously if, for example, an operation of mobile device 710, such as a location generation operation of a location generation component of mobile device 710 is associated with an anomaly. For example, the premises management system may compare the indicator included in the response to an anomalous operating condition, such as the condition of location services being disabled. A match or other correspondence between the indicator of the operation received from mobile device 710 and the anomalous operating condition may determine that the device is operating anomalously. In general, determinations that operation of a location generation component of a mobile computing device is associated with an anomaly may be made in accordance with any of the suitable techniques discussed herein, such as by the detection on an anomaly as discussed with respect to FIGS. 1-6. In response to this determination, at 930, premises management system 700 may transmit a notice to each mobile device 720, 730 included in the family account.

Additionally, in some implementations, responses such as at 920 may be received independent of a request from the premises management system. For example, each mobile device in the family account may periodically provide operation indicators, such as location indicators to the premises management system. These location indicators may be used by the premises management system in a manner similar to the requested location indicators described with respect to FIGS. 7-15.

Figure 10:
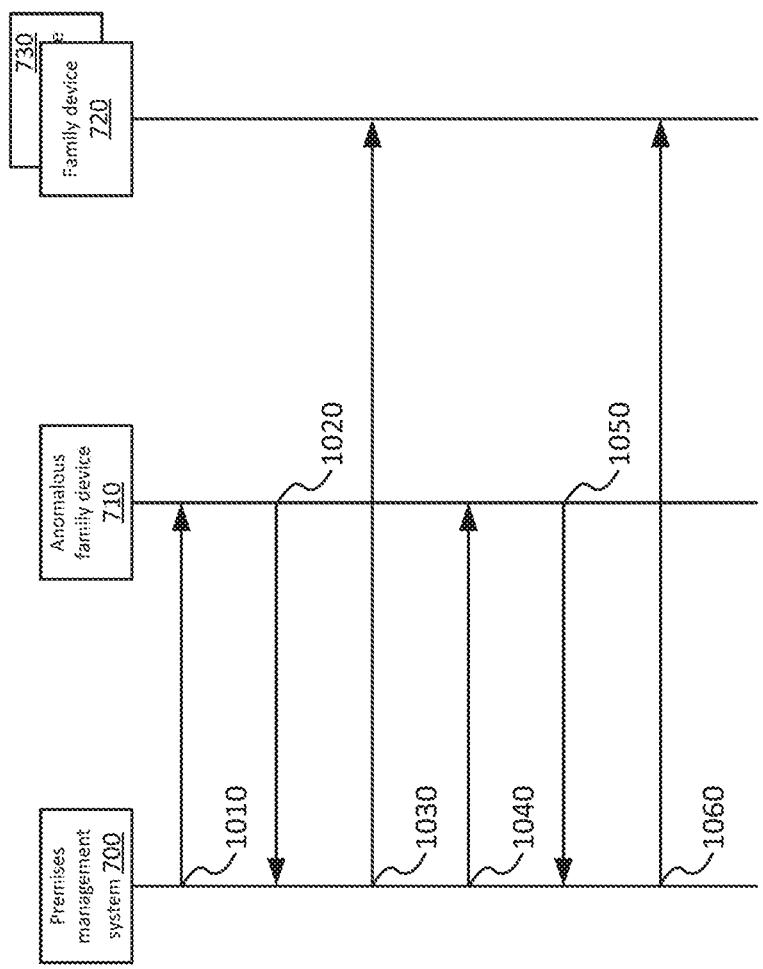
FIG. 10 shows a sequence diagram for providing notifications to devices associated with a premises management system according to an implementation of the disclosure.

In an implementation of this disclosure, it may be determined that a mobile device may have stopped operating anomalously and started operating normally. For example, FIG. 10 shows a sequence diagram for providing notifications to devices associated with a premises management system according to an implementation of this disclosure, where a notification may include an indicator that a formerly anomalously operating device is now operating normally. At 1010 premises management system 700 may transmit a request to mobile device 710, and at 1020 premises management system 700 may receive a response from mobile device 710. Premises management system 700 may determine that mobile device 710 is operating anomalously and at 1030, premises management system 700 may provide an indicator of mobile device 710's anomalous operation to each mobile device 720, 730 registered to the family account. At a later time, at 1040, premises management system 700 may provide a second request to mobile device 710. At 1050, mobile device 710 may provide a response to premises management system 700, and based on this response, premises management system 700 may determine that mobile device 710 is operating normally. For example an indicator included in the response at 1050 may not match any anomalous operating condition. As a result, at 1060, premises management system 700 may send a notice to family member mobile devices 720, 730 indicating mobile device 710 is operating normally.

Figure 11:
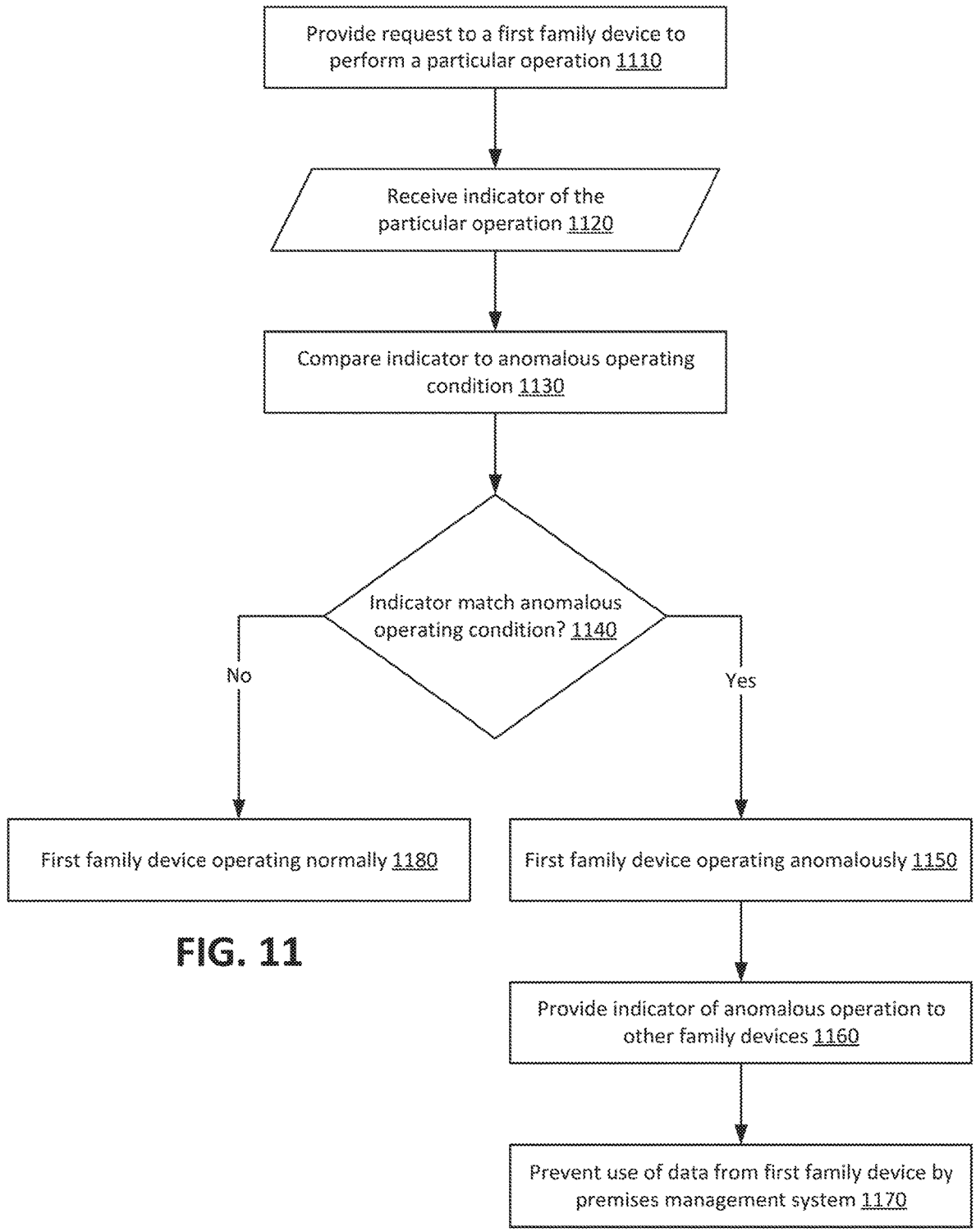
FIG. 11 shows a procedure in accordance with an implementation of the disclosure.

In implementations of this disclosure, a premises management system may prevent the receipt of data from an anomalously operating device. For example, FIG. 11 shows a procedure in accordance with an implementation of this disclosure. At 1110, a premises management system may send a request to a mobile device registered with an account such as the family account to perform a particular operation. For example, the request may be an instruction that when executed by the mobile device, causes the mobile device to determine its location. The mobile device may perform the particular operation, and at 1120, the premises management system may receive an indicator of the particular operation. For example, the indicator may be the location determined by the mobile device. In some implementations, the particular operation may be to determine a location of the mobile device multiple times within a configurable time period. For example, the request may be to determine how many times the mobile device has crossed a geofenced boundary in a five minute time period. The received indicator may be that mobile device has crossed the geofence boundary four times in a two minute period.

At 1130 the premises management system may compare the received indicator of the particular operation to an anomalous operating condition associated with the particular operation. For example, the anomalous operating condition may be crossing the geofenced boundary at least three times in a threshold five minute period of time. If the indicator is received one time in a five minute period, then the premises management system may determine that the received indicator does not match the anomalous operating condition, and at 1180, the mobile device may be determined to be operating normally. In general any number of indicators received or threshold period of time may be predetermined, preconfigured, or otherwise specified as is suitable for the purposes of the disclosure and the context of applications implementing the subject matter of this disclosure.

If the received indicator is four times in a two minute period, then the premises management system may determine at 1140 that the received indicator matches or otherwise satisfies the anomalous operating condition, and at 1150, the mobile device may be determined to be operating anomalously. The premises management system may then select mobile devices to receive a notification, and may select one or more mobile devices that are registered with the family account other than the mobile device operating anomalously.

In some implementations, only mobile devices associated with certain family members may be selected. For example, the parent's mobile device 730 and her oldest daughter's mobile device 720 may be selected because they may be configured within the family account to receive notices of anomalous operation. The youngest child's mobile device 710 may not be selected based on a configuration for her account indicating not to receive a notification. At 1160, the premises management system may provide an indicator of the anomalously operating mobile device to the selected mobile devices.

A 1170, in addition to or instead of providing notifications to mobile devices, premises management system 1170 may prevent use, by the premises management system, of data received from the anomalously operating mobile device. For example, a procedure may determine whether occupants of a home are home or away by determining whether location data from mobile devices of a family account for the home indicate locations within a geofence surrounding the home. In response to receiving an indicator of the anomalous performance of location operations by a mobile device within the family account, the premises management system may prevent the use of location data from the anomalous mobile device. For example all procedures executing on the premises management system my block or delete location data received from the anomalous device. In some implementations, the anomalous mobile device may be deleted from the family account, or data from the anomalous mobile device may be "quarantined" from procedures executing on the premises management system.

In some implementations, in addition to or instead of requesting that a mobile device associated with a particular account provide an indicator of a location, the mobile device may automatically periodically determine location and provide an indicator of the determined location to the premises management system. For example, a particular device may be one of a set of one or more devices registered or otherwise associated with a particular account, such as a family account. The particular device can periodically determine its location in accordance with a schedule or location sampling rate. The location of the device may be determined by a location generation component, such as a location service, utilizing one or more of the location generation techniques discussed herein, such as a WiFi-based techniques. Once the location is determined, the mobile device may transmit the location to the premises management system.

In an example, a computing device in communication with the premises management system may receive the indicator of location of the mobile device or may not receive an indicator. The computing device may store instructions, that when executed by a processor of the computing device, cause the processor to determine that the location generation component of the mobile device is associated with an anomaly. For example, the indicator may be received, but the location may significantly deviate from historical information about the location of the mobile device. This deviation may be associated with the operation of the location generation component being associated with an anomaly. In another example, no indicator may be received. The indicator may normally be received on a particular schedule or at a particular rate, and the absence of the indicator may be inconsistent with this schedule or rate. Such inconsistencies may be associated with the operation of the location generation component being associated with an anomaly. In general, any of the anomaly determination techniques discussed herein, such as those discussed with respect to FIGS. 1-5, may be employed to determine that the operation of the location generation component is associated with an anomaly.

In response to a determination that the location generation component is associated with an anomaly, according to an implementation, a computing device in communication with the premises management system may select a second mobile device from among the set of one or more devices associated with the account. In response to the selection, the computing device can provide a notice or other communication of the anomaly to the selected mobile device. For example, an alert may be transmitted to the selected mobile device that displays on a user interface of the mobile device, and indicates the original mobile device is operating anomalously.

Figure 12:
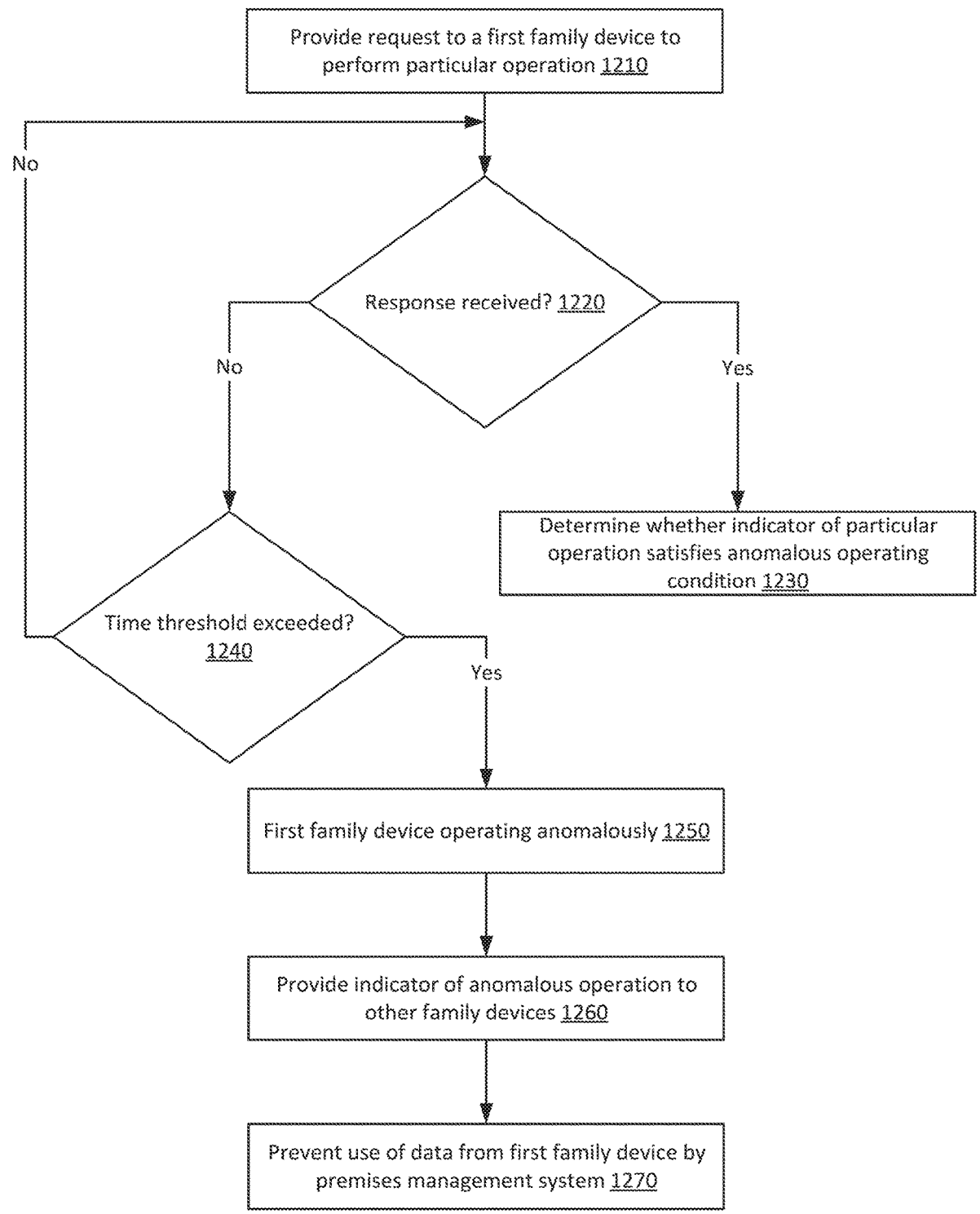
FIG. 12 shows a procedure in accordance with an implementation of the disclosure.

In implementations of this disclosure, notices may be provided to other mobile devices or data from an anomalous mobile device may be blocked based on an absence of a response from a mobile device. For example, FIG. 12 shows a procedure in accordance with an implementation of this disclosure. At 1210 a request may be provided to a mobile device to perform a particular operation. At 1220 it may be determined whether a response to the request has been received. If the response has not been received, then the amount of time that has elapsed since providing may be determined and compared to a threshold time period at 1240. If the threshold time period has not expired, then the procedure may return to determine whether a response has been received at 1220. If the threshold time period has expired, then at 1250 it may be determined that the mobile device is operating anomalously.

According to an implementation, notifications may be provided to selected mobile devices at 1260 and/or data associated with the anomalous operation may be blocked or otherwise prevented from being used by a premises management system at 1270. For example, a mobile device may be determined to be operating anomalously, and its location may have triggered an operation of a premises management system. For example, the mobile device may have generated a location indicating the mobile device was within a premises. This location may have trigger a low security state for a security subsystem of the premises management system. However, the location generation component of the mobile device may be operating anomalously, such as may be determined in accordance with any of the techniques described herein. In response to determining the location generation component is operating anomalously, the premises management system may prevent operation of the security system in the low state. For example, the premises management system may provide an instruction to the security system to enter a medium or high state.

As shown in FIG. 12, if a response was received in response to the request by premises management system to perform a particular operation, then at 1230 it may be determined whether an indicator of the particular operation received with the response satisfies an anomalous operation condition. In some examples, an anomalous operating condition may initially be satisfied but later become unsatisfied. For example, the mobile computing device may initially not respond within a threshold period of time, rate, or schedule and thus satisfy an anomalous operating condition. At a later time, the mobile device may begin to respond within the threshold period of time, rate, or schedule. In response, the premises management system may determine that the location generation component of the mobile device is operating normally. As a result, the computing device in communication with the premises management system can permit the execution by the premise management system of a non-functioning or otherwise prevented operation, such as the security level of the security system. Thus, for example, upon the determination that the location generation component is not operating anomalously, the security system may be permitted to change the security level to high.

Implementations of this disclosure may interface with members of the user community to improve the determination of anomalous operations. For example, as discussed above, a premises management system may provide a notice of a determined anomaly to one or more mobile devices. In addition to alerting the users of the mobile devices, the notice may include instructions to generate an interface on the mobile device prompting the respective user to confirm whether the determined anomaly was accurate.

In an example, a determined anomaly may be any type of anomaly discussed in this disclosures or otherwise suitable for the purposes of this disclosure. For example, an anomaly may be determined to be that a pattern of location indicators of the mobile device deviates from a pattern of historical location information for the mobile device. For example location indicators of a particular mobile device may indicate the mobile device was located a several different cities that are distant from a premises associated with the mobile device. There may not have been any intervening location indicators received between a location indicator received at the premises and a later location indicator received at a distant city. These indicators may be received at night after 10:00 pm. Historical information may indicate that the mobile device is most commonly located at the premises during this time or that, if the mobile device travels, there are a series of location indicators received as the mobile device travels away from the premises. Based on this deviation, the premises management system may determine that there is an anomalous operation.

The premises management system may provide notices to other mobile devices associated with a linked account to inform those users of the anomalously operating device. One or more of the notified users may select, via an interface of their mobile device, a prompt that denies that the operation was anomalous. For example, the user of the anomalous device in the preceding example may be known by other users to be on a road trip that night and traveling with his mobile device primarily powered off in order to save energy. A record may be generated by the premises management system indicating that the prior determined anomalous operation is associated with a user of an associated account selecting that the anomaly was inaccurate. This record may be used by the premises management system in the future to improve future anomaly determinations, such as, for example, in accordance with the machine learning techniques discussed below.

In some implementations, such as those discussed above with respect to FIGS. 1-6, an application executing on a particular mobile device may notify a user of the particular mobile device that the location generation component of the particular mobile device is associated with an anomaly. The anomaly may be any type of anomaly discussed in this disclosure or suitable for the purposes of this disclosure. For example, the anomaly may be a deviation from historical information discussed above, a misconfigured wireless radio of the particular mobile device, or that an operating system of the particular mobile device is not operating properly. A notice of the anomaly may be presented on the particular device and the user may be provided the opportunity to make a selection of whether a location generation operation associated with the determined anomaly is accurate or inaccurate. For example, the user may select whether the indicator of location of the mobile device is accurate or inaccurate. In response to the user's selection, the particular mobile device can generate a record associating the determined anomaly and the user's selection of accuracy or inaccuracy and provide the record to a remote computing device in communication with the premises management system.

In implementations of the disclosure, machine learning techniques may be employed to determine anomalies. Any machine learning technique may be employed that is suitable for the purposes of this disclosure. Suitable machine learning techniques may include linear regression, naïve Bayes, logistic regression, optimized logistic regression, and neural networks. Neural networks may include a deep neural network that includes multiple neural network layers. In some implementations, in addition or as alternatives to a deep neural network, the neural network may include one or more recurrent neural network layers such as long short-term memory layers, one or more convolutional neural network layers, or one or more local contrast normalization layers. Neural networks, as described herein, may also have the architecture of a convolutional, long short-term memory, fully connected deep neural network. In some instances, various types of filters such as infinite impulse response filters, linear predictive filters, Kalman filters, or the like may be implemented in addition to or as part of one or more of the neural network layers.

In implementations of the disclosure, one or more computing devices in communication with a premises management system may execute machine learning techniques to determine anomalies. For example, a computing device may receive from a particular mobile device, a record indicating that a prior determined anomaly is associated with a selection by a user of the particular mobile device indicating a prior indicator of the location of the particular mobile device was accurate or inaccurate. The computing device executing machine learning techniques may process the record along with other data about the state of the particular computing device, and/or other data aggregated from other mobile devices associated with anomaly determinations to determine anomaly criteria.

According to an implementation, anomaly criteria may function as or define anomalous operating conditions as discussed throughout this disclosure and serve as a basis for determining anomalies. For example, satisfaction of anomaly criteria may determine the existence of an anomaly.

As an example, a record indicating that a user confirmed that a location indicator of the user's mobile device was inaccurate when that location indicator was associated with an anomaly may serve to increase a machine learning factor such as a transition probability, node value, weighting, or similar relationship when the record is being processed by machine learning techniques to determine characteristics of the anomaly. Similarly a user's contradiction of a location indicator as inaccurate may serve to weaken a machine learning factor. Multiple records from multiple mobile devices may be processed by machine learning techniques in the aggregate to compare and identify the strength of the relationship between characteristics of anomalies and accurate or inaccurate location indicators. A set of the strongest characteristics may be identified and serve as anomaly criteria for the identification of future anomalies.

Machine learning techniques may be applied to a large numbers of records of anomalies that have been verified or contradicted by users. These records may include information such as the state of the mobile device or the device behavior when the anomaly was detected. By analyzing large volumes of records, machine learning techniques may extract common characteristics among devices that submitted reports. Characteristics or sets of characteristics may be previously unrecognized as affecting the functioning of location generation components. For example characteristics may include certain protocols or configurations of the mobile device or components with which the mobile device interacts, such as routers, cellular access points, or operating systems. These characteristics or sets of characteristics may be grouped or classified as anomaly criteria.

In some implementations, anomaly criteria may define an anomaly. For example anomaly criteria may include aspects of the state of a mobile device such as whether one or more a wireless radios are activated, how they are configured, the state of an operating system executing on the mobile device, historical location information for the mobile device, historical patterns of location information for the mobile device, as well as any other criteria suitable for the purposes of the disclosure. In some implementations the determination that an operation of a location generation component on a mobile device is associated with an anomaly may be based on the anomaly criteria and thereby also based on a received record that contributed to that anomaly criteria. For example, if anomaly criteria associated with a particular anomaly are substantially matched, then the anomaly may be determined to be present and the operation of the location generation component may be determined to be associated with the anomaly.

Determination of an anomaly based on anomaly criteria may take place on one or more computing devices in communication with a premises management system, or on a mobile device. For example a mobile device may receive anomaly criteria determined by a machine learning system based on a prior record provided by the mobile device to the machine learning system. The mobile device may execute instructions to determine whether an indicator of a location of the mobile device is associated with an anomaly based on the received anomaly criteria in accordance with the techniques and procedures discussed throughout this disclosure.

FIG. 13 is a block diagram of an example of a premises management device 1300 according to an implementation of the disclosure. Premise management device 1300 can include a processor 1308, a memory 1310, a user interface (UI) 1304, a communications interface 1306, an internal bus 1312, and one or more sensors 1302. Premises management device 1300 may constitute or be a component of a premises management system as discussed throughout this disclosure. A person of ordinary skill in the art appreciates that various components of the premises management device 1300 described herein can include additional electrical circuit(s). Furthermore, it is appreciated that many of the various components listed above can be implemented on one or more integrated circuit (IC) chips. For example, in one embodiment, a set of components can be implemented in a single IC chip. In other embodiments, one or more of respective components can be fabricated or implemented on separate IC chips.

The sensor 1302 can be an environmental sensor, such as a temperature sensor, smoke sensor, carbon monoxide sensor, motion sensor, accelerometer, proximity sensor, passive infrared (PIR) sensor, magnetic field sensor, radio frequency (RF) sensor, light sensor, humidity sensor, pressure sensor, microphone, compass, or any other environmental sensor that obtains or provides a corresponding type of information about the environment in which the premises management device 1300 is located.

The processor 1308 can be a central processing unit (CPU) or other type of processor and can be communicably connected to the other components to receive and analyze data obtained by the sensor 1302, can transmit messages or packets that control operation of other components of the premises management device 1300 and/or external devices, and can process communications between the premises management device 1300 and other devices. The processor 1308 can execute instructions and/or computer executable components stored on the memory 1310. Such computer executable components can include, for example, a primary function component to control a primary function of the premises management device 1300 related to managing a premises, a communication component to locate and communicate with other compatible premises management devices, a computational component to process system related tasks, or any combination thereof.

The memory 1310 or another memory in the premises management device 1300 can also be communicably connected to receive and store environmental data obtained by the sensor 1302. A communication interface 1306 can function to transmit and receive data using a wireless protocol, such as a WiFi™, Thread®, or other wireless interface, Ethernet® or other local network interface, Bluetooth® or other radio interface, or the like and can facilitate transmission and receipt of data by the premises management device 1300 to and from other devices.

The user interface (UI) 1304 can provide information and/or receive input from a user of the premises management system 204. The UI 1304 can include, for example, a speaker to output an audible sound when an event is detected by the premises management device 1300. Alternatively or additionally, the UI 1304 can include a light to be activated when an event is detected by the premises management device 1300. The UI 1304 can be relatively minimal, such as a liquid crystal display (LCD), light-emitting diode (LED) display, or limited-output display, or it can be a full-featured interface such as a touchscreen, keypad, or selection wheel with a click-button mechanism to enter input.

Internal components of the premises management device 1300 can transmit and receive data to and from one another via an internal bus 1312 or other mechanism. One or more components can be implemented in a single physical arrangement, such as where multiple components are implemented on a single integrated circuit. Premises management devices 1300 can include other components, and/or may not include all of the components illustrated.

The sensor 1302 can obtain data about the premises, and at least some of the data can be used to implement the security system. Through the bus 1312 and/or communication interface 1306, sensor data can be transmitted to or accessible by other components of the premises management system 204.

Generally, two or more sensors 1302 on one or more premises management devices 1300 can generate data that can be coordinated by the primary system processor to determine a system response and/or infer a state of the environment. In one example, the primary system processor of the system can infer a state of intrusion based on data from entry detection sensors and motion sensors and, based on the determined state, further determine whether an unauthorized party is present and a location, within the premises, of the unauthorized party.

In another example, an ambient light sensor in a room may determine that the room is dark (e.g., less than 60 lux). A microphone in the room may detect a sound above a set threshold, such as 60 dB. The system processor may determine, based on the data generated by both sensors, that it should activate one or more lights in the room. In the event the processor only received data from the ambient light sensor, the system may not have any basis to alter the state of the lighting in the room. Similarly, if the processor only received data from the microphone, the system may lack sufficient data to determine whether activating the lights in the room is necessary, for example, during the day the room may already be bright or during the night the lights may already be on. As another example, two or more sensors may communicate with one another. Thus, data generated by multiple sensors simultaneously or nearly simultaneously may be used to determine a state of an environment and, based on the determined state, generate a response.

As another example, a system may employ a magnetometer affixed to a door jamb and a magnet affixed to the door. When the door is closed, the magnetometer may detect the magnetic field emanating from the magnet. If the door is opened, the increased distance may cause the magnetic field near the magnetometer to be too weak to be detected by the magnetometer. If the system is activated, it may interpret such non-detection as the door being ajar or open. In some configurations, a separate sensor or a sensor integrated into one or more of the magnetometer and/or magnet may be incorporated to provide data regarding the status of the door. For example, an accelerometer and/or a compass may be affixed to the door and indicate the status of the door and/or augment the data provided by the magnetometer. A compass or similar sensor may be used in conjunction with a magnet, such as to more precisely determine a distance from the magnet, or it may be used alone and provide environmental information based on the ambient magnetic field, as with a conventional compass.

In some configurations, an accelerometer may be employed to indicate how quickly the door is moving. For example, the door may be lightly moving due to a breeze. This may be contrasted with a rapid movement due to a person swinging the door open. The data generated by the compass, accelerometer, and/or magnetometer may be analyzed and/or provided to a central system such as a controller device 1412 and/or remote system 1408 depicted in FIG. 14 below. The data may be analyzed to learn a user behavior, an environment state, and/or as a component of a smart home system. While the above example is described in the context of a door, a person having ordinary skill in the art will appreciate the applicability of the disclosed subject matter to other implementations such as a window, garage door, fireplace doors, vehicle windows/doors, faucet positions (e.g., an outdoor spigot), a gate, seating position, other openings, etc.

The data collected from one or more sensors may be used to determine the physical status and/or occupancy status of a premises, for example whether one or more family members are home or away. For example, open/close sensors such as door sensors may be used to determine that an unknown person has entered the premises. The system may first determine that a person has entered the premises due to sensors detecting a door opening and closing in a time span previously determined to be consistent with a person entering or leaving the premises. The system next may identify the person as "unknown" due to the absence of a smartphone, key fob, wearable device, or other device typically used to identify occupants of the premises. Continuing the example, sensor data may be received indicating that a valuable item within the premises has been moved, or that a component of the smart home environment associated with security functions such as a controller disclosed herein, has been moved or damaged. Such sensor data may be received, for example, from a sensor attached to or otherwise associated with the valuable item, from the smart home component itself, or from one or more other sensors within the premises. In response, the system may generate an alert indicating that an unknown person has entered the premises and/or that the item or component has been moved or damaged. The system may further determine that an occupant of the home is close by but not present in the premises, for example based upon a Wi-Fi signal received from the occupant's smartphone, but an absence of near-field or other short-range communication from the same smartphone. In this case, the system may be configured to send the alert to the occupant's smartphone, such as via SMS, email, or other communication. As another example, the system may determine that the premises is already in an "away" state and that no occupants are nearby or expected to return in the near future. In this case, the system may be configured to send the alert to a local law enforcement agency, such as via email, SMS, recorded phone call, or the like.

Data generated by one or more sensors may indicate patterns in the behavior of one or more users and/or an environment state over time, and thus may be used to "learn" such characteristics. For example, sequences of patterns of radiation may be collected by a capture component of a device in a room of a premises and used as a basis to learn object characteristics of a user, pets, furniture, plants, and other objects in the room. These object characteristics may make up a room profile of the room and may be used to make determinations about objects detected in the room.

In another example, data generated by an ambient light sensor in a room of a house and the time of day may be stored in a local or remote storage medium with the permission of an end user. A processor in communication with the storage medium may compute a behavior based on the data generated by the light sensor. The light sensor data may indicate that the amount of light detected increases until an approximate time or time period, such as 3:30 pm, and then declines until another approximate time or time period, such as 5:30 pm, at which point there is an abrupt increase in the amount of light detected. In many cases, the amount of light detected after the second time period may be either below a dark level of light (e.g., under or equal to 60 lux) or bright (e.g., equal to or above 400 lux). In this example, the data may indicate that after 5:30 pm, an occupant is turning on/off a light as the occupant of the room in which the sensor is located enters/leaves the room. At other times, the light sensor data may indicate that no lights are turned on/off in the room. The system, therefore, may learn occupants' patterns of turning on and off lights, and may generate a response to the learned behavior. For example, at 5:30 pm, a smart home environment or other sensor network may automatically activate the lights in the room if it detects an occupant in proximity to the home. In some embodiments, such behavior patterns may be verified using other sensors. Continuing the example, user behavior regarding specific lights may be verified and/or further refined based upon states of, or data gathered by, smart switches, outlets, lamps, and the like.

Such learning behavior may be implemented in accordance with the techniques disclosed herein. For example, a system of smart home environment as disclosed herein may be configured to learn appropriate notices to generate or other actions to take in response to a determination that a notice should be generated, and/or appropriate recipients of a particular notice or type of notice. As a specific example, a system of smart home environment may determine that after a notice has been sent to a first occupant of a premises indicating that a window in a room has been left open, a second occupant is always detected in the room within a threshold time period, and the window is closed shortly thereafter. After making such a determination, in future occurrences the notice may be sent to the second occupant or to both occupants for the purposes of improving the efficacy of the notice. In an implementation, such learned behaviors may be reviewed, overridden, modified, or the like by a user of the system, such as via a computer-provided interface to as disclosed herein FIG. 14 is a block diagram of an example of a premises management system 1400 according to an implementation of the disclosure. The premises management system 1400 can include security system features. The premises management system 1400 can be implemented over any suitable wired and/or wireless communication networks. One or more premises management devices, i.e., sensors 1402, 1404, 1406, and one or more controller devices 1412 can communicate via a local network 1414, such as a WiFi™ or other suitable network, with each other. The network 1414 can include a mesh-type network such as a Thread® network, which can provide network architecture and/or protocols for devices to communicate with one another. An authorized party can therefore interact with the premises management system 1400, for example, using the controller device 1412, which can communicate with the rest of the premises management system 1400 via the network 1414.

The controller device 1412 and/or one or more of the sensors 1402, 1404, 1406, can be configured to implement a primary system processor 1410. The primary system processor 1410 can, for example, receive, aggregate, and/or analyze environmental information received from the sensors 1402, 1404, 1406, and the controller device 1412. Furthermore, a portion or percentage of the primary system processor 1410 can be implemented in a remote system 1408, such as a cloud-based reporting and/or analysis system. The remote system 1408 can, for example, independently aggregate data from multiple locations, provide instruction, software updates, and/or aggregated data to a controller 1412, primary system processor 1410, and/or sensors 1402, 1404, 1406.

The sensors 1402, 1404, 1406, can be disposed locally to one another, such as within a single dwelling, office space, building, room, or the like, or they may be disposed remote from each other, such as at various locations around a wide perimeter of a premises. In some embodiments, sensors 1402, 1404, 1406, can communicate directly with one or more remote systems 1408. The remote system 1408 can, for example, aggregate data from multiple locations, provide instruction, software updates, and/or aggregated data to the primary system processor 1410, controller device 1412, and/or sensors 1402, 1404, 1406. Additionally, remote system 1408 can refer to a system or subsystem that is a part of a third party monitoring service or a law enforcement service.

The premises management system illustrated in FIG. 14 can be a part of a smart-home environment, which can include a structure, such as a house, office building, garage, mobile home, or the like. The devices of the smart home environment, such as the sensors 1402, 1404, 1406, and the network 1414 can be integrated into a smart-home environment that does not include an entire structure, such as a single unit in an apartment building, condominium building, or office building.

The smart home environment can control and/or be coupled to devices outside of the structure. For example, one or more of the sensors 1402, 1404 can be located outside the structure at one or more distances from the structure (e.g., sensors 1402, 1404 can be disposed outside the structure, at points along a land perimeter on which the structure is located, or the like. One or more of the devices in the smart home environment may not be physically within the structure. For example, the controller 1412, which can receive input from the sensors 1402, 1404, can be located outside of the structure.

The structure of the smart-home environment can include a plurality of rooms, separated at least partly from each other via walls. The walls can include interior walls or exterior walls. Each room can further include a floor and a ceiling. Devices of the smart-home environment, such as the sensors 1402, 1404, can be mounted on, integrated with, and/or supported by a wall, floor, or ceiling of the structure.

The controller device 1412 can be a general or special-purpose controller. For example, one type of controller device 1412 can be a general-purpose computing device running one or more applications that collect and analyze data from one or more sensors 1402, 1404, 1406 within the home. In this case, the controller device 1412 can be implemented using, for example, a mobile computing device such as a mobile phone, a tablet computer, a laptop computer, a personal data assistant, or wearable technology. Another example of a controller device 1412 can be a special-purpose controller that is dedicated to a subset of functions, such as a security controller that collects, analyzes and provides access to sensor data primarily or exclusively as it relates to various security considerations for a premises.

The controller device 1412 can be located locally with respect to the sensors 1402, 1404, 1406 with which it can communicate and from which it can obtain sensor data, such as in the case where it is positioned within a home that includes a home automation and/or sensor network. Alternatively or additionally, controller device 1412 can be remote from the sensors 1402, 1404, 1406, such as where the controller device 1412 is implemented as a cloud-based system that can communicate with multiple sensors 1402, 1404, 1406, which can be located at multiple locations and can be local or remote with respect to one another.

Sensors 1402, 1404, 1406 can communicate with each other, the controller device 1412, and the primary system processor 1410 within a private, secure, local communication network that can be implemented wired or wirelessly, and/or a sensor-specific network through which sensors 1402, 1404, 1406 can communicate with one another and/or with dedicated other devices. Alternatively, as illustrated in FIG. 14, one or more sensors 1402, 1404, 1406 can communicate via a common local network 1414, such as a Wi-Fi™, Thread®, or other suitable network, with each other, and/or with the controller 1412 and primary system processor 1410. Alternatively or additionally, sensors 1402, 1404, 1406 can communicate directly with a remote system 1408.

The communication and network protocols used by the devices communicatively coupled to the network 1414 may provide secure communications, minimize the amount of power used (i.e., be power efficient), and support a wide variety of devices and/or products in a home, such as appliances, access control, climate control, energy management, lighting, safety, and security. For example, the protocols supported by the network and the devices connected thereto may have an open protocol which may carry IPv6 natively.

A Thread® network, such as network 1414, may be easy to set up and secure to use. The network 1414 may use an authentication scheme, such as AES (Advanced Encryption Standard) encryption or the like, to reduce and/or minimize security holes that exist in other wireless protocols. The Thread network may be scalable to connect devices (e.g., 2, 5, 10, 20, 50, 100, 310, 200, or more devices) into a single network supporting multiple hops (e.g., so as to provide communications between devices when one or more nodes of the network is not operating normally). The network 1414, which may be a Thread network, may provide security at the network and application layers. One or more devices communicatively coupled to the network 1414 (e.g., controller device 1412, remote system 1408, and the like) may store product install codes to ensure only authorized devices can join the network 1414. One or more operations and communications of network 1414 may use cryptography, such as public-key cryptography.

The devices communicatively coupled to the network 1414 of the smart home environment disclosed herein may have low power consumption and/or reduced power consumption. That is, devices efficiently communicate to with one another and operate to provide functionality to the user, where the devices may have reduced battery size and increased battery lifetimes over conventional devices. The devices may include sleep modes to increase battery life and reduce power requirements. For example, communications between devices coupled to the network 1414 may use the power-efficient IEEE 802.15.4 MAC/PHY protocol. In embodiments of the disclosed subject matter, short messaging between devices on the network 1414 may conserve bandwidth and power. The routing protocol of the network 1414 may reduce network overhead and latency. The communication interfaces of the devices coupled to the smart home environment may include wireless system-on-chips to support the low-power, secure, stable, and/or scalable communications network 1414.

The smart-home environment, including the sensor network shown in FIG. 14, can include a plurality of premises management devices, including intelligent, multi-sensing, network-connected devices that can integrate seamlessly with each other and/or with a central server or a cloud-computing system (e.g., device controller 1412 and/or remote system 1408) to provide home-security and smart-home features. Such devices can include one or more intelligent, multi-sensing, network-connected thermostats (e.g., "smart thermostats"), one or more intelligent, network-connected, multi-sensing hazard detection units (e.g., "smart hazard detectors"), one or more intelligent, multi-sensing, network-connected entryway interface devices (e.g., "smart doorbells"), or any combination thereof. The smart hazard detectors, smart thermostats, and smart doorbells can be, for example, the sensors 1402, 1404, 1406 illustrated in FIG. 14. These premises management devices can be used by the security system, but can also have separate, primary functions.

For example, a smart thermostat can detect ambient climate characteristics (e.g., temperature and/or humidity) and can accordingly control a HVAC system of the structure. For example, the ambient climate characteristics can be detected by sensors 1402, 1404, 1406 illustrated in FIG. 14, and the controller 1412 can control the HVAC system (not illustrated) of the structure. However, unusual changes in temperature of a given room can also provide data that can supplement a determination of whether a situation is a security concern, for example, detecting a rapid drop in temperature in a given room due to a broken in window.

As another example, a smart hazard detector can detect the presence of a hazardous substance or a substance indicative of a hazardous substance (e.g., smoke, fire, or carbon monoxide). For example, smoke, fire, and/or carbon monoxide can be detected by sensors 1402, 1404, 1406 illustrated in FIG. 14, and the controller 1412 can control an alarm system to provide a visual and/or audible alarm to the user of the smart-home environment. However, the speaker of the hazard detector can also be used to announce security related messages.

As another example, a smart doorbell can control doorbell functionality, detect a person's approach to or departure from a location (e.g., an outer door to the structure), and announce a person's approach or departure from the structure via an audible and/or visual message that can be output by a speaker and/or a display coupled to, for example, the controller 1412. However, the detection of an approach of an unknown party can provide data to the security system to supplement determining whether the presence of the unknown party is a security concern.

In some embodiments, the smart home environment implemented over the network 1414 shown in FIG. 14 may include one or more intelligent, multi-sensing, network-connected wall switches (e.g., "smart wall switches"), one or more intelligent, multi-sensing, network-connected wall plug interfaces (e.g., "smart wall plugs"). The smart wall switches and/or smart wall plugs may be or include one or more of the sensors 1402 and 1404 shown in FIG. 14. A smart wall switch may detect ambient lighting conditions, and control a power and/or dim state of one or more lights. For example, a sensor such as sensors 1402 and 1404, may detect ambient lighting conditions, and a device such as the controller device 1412 may control the power to one or more lights (not shown) in the smart home environment. Smart wall switches may also control a power state or speed of a fan, such as a ceiling fan. For example, sensors 1402 and 1404 may detect the power and/or speed of a fan, and the controller device 1412 may adjust the power and/or speed of the fan, accordingly. Smart wall plugs may control supply of power to one or more wall plugs (e.g., such that power is not supplied to the plug if nobody is detected to be within the smart home environment). For example, one of the smart wall plugs may control supply of power to a lamp (not shown).

A smart-home environment can include one or more intelligent, multi-sensing, network-connected entry detectors (e.g., "smart entry detectors") that can be specifically designed to function as part of a security subsystem. Such detectors can be or can include one or more of the sensors 1402, 1404, 1406 illustrated in FIG. 14. The smart entry detectors can be disposed at one or more windows, doors, and other entry points of the smart-home environment to detect when a window, door, or other entry point is opened, broken, breached, and/or compromised. The smart entry detectors can generate a corresponding signal to be provided to the controller 1412, primary system processor 1410, and/or the remote system 1408 when a window or door is opened, closed, breached, and/or compromised. In some embodiments of the security system, the alarm, which can be included with controller device 1412 and/or coupled to the network 1414, may not arm unless all smart entry detectors (e.g., sensors 1402, 1404, 1406) indicate that all doors, windows, entryways, and the like are closed and/or that all smart entry detectors are armed.

The smart home environment implemented over the network shown in FIG. 14 can include one or more intelligent, multi-sensing, network-connected doorknobs (e.g., "smart doorknob"). For example, the sensors 1402 and 1404 may be coupled to a doorknob of a door (e.g., doorknobs located on external doors of the structure of the smart home environment). However, it should be appreciated that smart doorknobs can be provided on external and/or internal doors of the smart home environment.

The smart thermostats, the smart hazard detectors, the smart doorbells, the smart wall switches, the smart wall plugs, the smart entry detectors, the smart doorknobs, the keypads, and other devices of a smart home environment (e.g., as illustrated as sensors 1402 and 1404 of FIG. 14) can be communicatively coupled to each other via the network 1414, and to the controller 1412 and/or remote system 1408 to provide security, safety, and/or comfort for the smart home environment. Alternatively or in addition, each of the devices of the smart home environment may provide data that can be used to determine an occupancy and/or physical status of a premises, as well as data that may be used to determine an appropriate recipient of a notification, as previously disclosed herein.

One or more users can control one or more of the network-connected smart devices in the smart-home environment using a network-connected computer or portable electronic device. In some examples, some or all of the users (e.g., individuals who live in the home) can register their mobile device, token and/or key fobs with the smart-home environment (e.g., with the controller 1412). Such registration can be made at a central server (e.g., the controller 1412 and/or the remote system 14014) to authenticate the user and/or the electronic device as being associated with the smart-home environment, and to provide permission to the user to use the electronic device to control the network-connected smart devices and the security system of the smart-home environment. A user can use their registered electronic device to remotely control the network-connected smart devices and security system of the smart-home environment, such as when the occupant is at work or on vacation. The user can also use their registered electronic device to control the network-connected smart devices when the user is located inside the smart-home environment.

As an alternative to or in addition to registering electronic devices, the smart-home environment can make inferences about which individuals live in the home and are therefore users and which electronic devices are associated with those individuals. As such, the smart-home environment can learn who is a user (e.g., an authorized user) and permit the electronic devices associated with those individuals to control the network-connected smart devices of the smart-home environment (e.g., devices communicatively coupled to the network 1414) including, in some embodiments, sensors used by or within the smart-home environment. Various types of notices and other information can be provided to users via messages sent to one or more user electronic devices. For example, the messages can be sent via e-mail, short message service (SMS), multimedia messaging service (MMS), unstructured supplementary service data (USSD), as well as any other type of messaging services and/or communication protocols. As previously described, such notices may be generated in response to specific determinations of the occupancy and/or physical status of a premises, or they may be sent for other reasons as disclosed herein.

FIG. 15 is a block diagram of an example of a computing device 1500 suitable for implementing certain devices illustrated in FIGS. 1 through 14. The computing device 1500 can be used to implement, for example, the controller device 1412 or a premises management device including sensors as described above. The computing device 1500 can be constructed as a custom-designed device or can be, for example, a special-purpose desktop computer, laptop computer, or mobile computing device such as a smart phone, tablet, personal data assistant, wearable technology, or the like.

The computing device 1500 can include a bus 1502 that interconnects major components of the computing device 1500. Such components can include a central processor 1504; a memory 1506 (such as Random Access Memory (RAM), Read-Only Memory (ROM), flash RAM, or the like), a sensor 1508 (which can include one or more sensors), a display 1510 (such as a display screen), an input interface 1512 (which can include one or more input devices such as a keyboard, mouse, keypad, touch pad, turn-wheel, and the like), a fixed storage 1514 (such as a hard drive, flash storage, and the like), a removable media component 1516 (operable to control and receive a solid-state memory device, an optical disk, a flash drive, and the like), a network interface 1518 (operable to communicate with one or more remote devices via a suitable network connection), and a speaker 1520 (to output an audible communication). In some embodiments the input interface 1512 and the display 1510 can be combined, such as in the form of a touch screen.

The bus 1502 can allow data communication between the central processor 1504 and one or more memory components 1514, 1516, which can include RAM, ROM, or other memory. Applications resident with the computing device 1500 generally can be stored on and accessed via a computer readable storage medium.

The fixed storage 1514 can be integral with the computing device 1500 or can be separate and accessed through other interfaces. The network interface 1518 can provide a direct connection to the premises management system and/or a remote server via a wired or wireless connection. The network interface 1518 can provide such connection using any suitable technique and protocol, including digital cellular telephone, WiFi™, Thread®, Bluetooth®, near field communications (NFC), and the like. For example, the network interface 1518 can allow the computing device 1500 to communicate with other components of the premises management system or other computers via one or more local, wide-area, or other communication networks.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, specific information about a user's residence may be treated so that no personally identifiable information can be determined for the user, or a user's geographic location may be generalized where location information is obtained (such as to a city, ZIP code, or state level), so that a particular location of a user cannot be determined. As another example, systems disclosed herein may allow a user to restrict the information collected by those systems to applications specific to the user, such as by disabling or limiting the extent to which such information is aggregated or used in analysis with other information from other users. Thus, the user may have control over how information is collected about the user and used by a system as disclosed herein.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method comprising:
   receiving an indicator of a location of a mobile computing device;
   triggering, based on receiving the indicator of the location of the mobile computing device, an operation of a security system configured to be installed in a building;
   determining, by an application executing on a processor within the security system, that an anomaly was present at a time when the indicator of the location of the mobile computing device was generated, the anomaly comprising at least one of
      an improper operation of a location generation component of the mobile computing device,
      a loss of reception of a signal from which the location of the mobile computing device is determined, and
      a deviation from a collection of historical location information of the mobile computing device;
   causing, by the processor and based on determining that the anomaly was present, a notice of the anomaly to be provided; and
   preventing, by the processor and based on determining that the anomaly was present, the operation of the security system triggered by receiving the indicator of the location of the mobile computing device.

2. The method of claim 1, wherein the causing the notice of the anomaly to be provided comprises causing the notice of the anomaly to be provided to a user of the mobile computing device.

3. The method of claim 2, wherein the causing the notice of the anomaly to be provided comprises causing the notice of the anomaly to be provided to the user of the mobile computing device via a user interface of the mobile computing device.

4. The method of claim 1, wherein the causing the notice of the anomaly to be provided comprises causing the notice of the anomaly to be provided to a second mobile computing device, the second mobile computing device being different from the mobile computing device.

5. The method of claim 4, further comprising determining, by the processor, that the mobile computing device and the second mobile computing device are members of a set of mobile computing devices, the set of mobile computing devices associated with an account that maintains information about the set of mobile computing devices.

6. The method of claim 5, further comprising causing, by the processor, a communication with an application operating on another computing device, the application operating on the other computing device being for the account that maintains information about the set of mobile computing devices.

7. The method of claim 6, wherein the other computing device is located at a premises associated with at least one user of at least one mobile computing device of the set of mobile computing devices.

8. The method of claim 6, wherein the other computing device is located at a location remote from a premises associated with at least one user of at least one mobile computing device of the set of mobile computing devices.

9. A non-transitory computer-readable medium storing computer code for controlling a processor to cause the processor to perform a method, the computer code including instructions to cause the processor to:
   receive an indicator of a location of a mobile computing device;
   trigger, based on receiving the indicator of the location of the mobile computing device, an operation of a security system configured to be installed in a building;
   determine, by an application within the security system, that an anomaly was present at a time when the indicator of the location of the mobile computing device was generated, the anomaly comprising at least one of
      an improper operation of a location generation component of the mobile computing device,
      a loss of reception of a signal from which the location of the mobile computing device is determined, and
      a deviation from a collection of historical location information of the mobile computing device; and
   cause, based on determining that the anomaly was present, a notice of the anomaly; and
   prevent, based on determining that the anomaly was present, the operation of the security system triggered by receiving the indicator of the location of the first mobile computing device.

10. A system comprising:
a memory configured to store an application within a security system configured to be installed in a building; and
a processor configured to execute the application to:
  receive an indicator of a location of a mobile computing device;
  trigger, based on receiving the indicator of the location of the mobile computing device, an operation of the security system;
  determine, by the application, that an anomaly was present at a time when the indicator of the location of the mobile computing device was generated, the anomaly comprising at least one of
    an improper operation of a location generation component of the mobile computing device,
    a loss of reception of a signal from which the location of the mobile computing device is determined, and
    a deviation from a collection of historical location information of the mobile computing device;
  cause, based on determining that the anomaly was present, a notice of the anomaly to be provided; and
  prevent, based on determining that the anomaly was present, the operation of the security system triggered by receiving the indicator of the location of the mobile computing device.

* * * * *